US012321437B2

(12) United States Patent
Weiner et al.

(10) Patent No.: US 12,321,437 B2
(45) Date of Patent: Jun. 3, 2025

(54) METHOD AND APPARATUS FOR SECURE AUTHENTICATION BASED ON PROXIMITY

(71) Applicant: Ping Identity Corporation, Denver, CO (US)

(72) Inventors: Avish Jacob Weiner, Tel Aviv-Jaffa (IL); Ran Ne'man, Ramat Gan (IL); Segev Sherry, Yavne (IL); Yuri Glick, Petah Tikva (IL); Guy Solomon, Rosh A'ayin (IL); Joseph Yuval Walters, Harish (IL)

(73) Assignee: Ping Identity Corporation, Denver, CO (US)

( * ) Notice: Subject to any disclaimer, the term of this patent is extended or adjusted under 35 U.S.C. 154(b) by 338 days.

(21) Appl. No.: 18/156,668

(22) Filed: Jan. 19, 2023

(65) Prior Publication Data

US 2023/0229750 A1    Jul. 20, 2023

Related U.S. Application Data

(60) Provisional application No. 63/301,206, filed on Jan. 20, 2022.

(51) Int. Cl.
| | |
|---|---|
| *H04L 29/06* | (2006.01) |
| *G06F 21/32* | (2013.01) |
| *G06F 21/35* | (2013.01) |

(52) U.S. Cl.
CPC .............. *G06F 21/35* (2013.01); *G06F 21/32* (2013.01)

(58) Field of Classification Search
CPC ... G06F 21/35; G06F 21/32; G06F 2221/2111
See application file for complete search history.

(56) References Cited

U.S. PATENT DOCUMENTS 11,140,157 B1 * 10/2021  Xia ..................... H04L 63/0853
2008/0222711 A1    9/2008  Michaelis
(Continued)

OTHER PUBLICATIONS

Findling, R. D. et al. "ShakeUnlock: Securely transfer authentication states between mobile devices," Jan. 2016, IEEE Transactions on Mobile Computing 16(4):1-1, 15 pages. DOI:10.1109/TMC.2016.2582489.

(Continued)

*Primary Examiner* — William A Corum, Jr.
(74) *Attorney, Agent, or Firm* — COOLEY LLP

(57) ABSTRACT

In an embodiment, a set of dynamic proximity attribute (DPA) Risk Signals (RS) indicating whether a user is within a predetermined proximity of a registered user mobile device (RUMD) and a registered user device (RUD) is received from the RUMD and at an identity provider (IDP) communicably coupled to the RUMD based on short-range communication between the RUMD and the RUD. The RUMD is configured to monitor devices in short-range communication in a dynamic proximity area network (DPxAN) via an IDP application (IDPAmd) associated with the RUMD. A Risk Parameter Value (RPV) is determined according to at least the set of DPA RS received from the RUMD. A passwordless request to authenticate the user at the RUD on which a user access request originated is received from a Service Provider (SPn) by the IDP. An authentication response is sent from the IDP to the SPn based on the RPV.

24 Claims, 15 Drawing Sheets

(56) References Cited

U.S. PATENT DOCUMENTS

| | | |
|---|---|---|
| 2010/0062758 A1 | 3/2010 | Proctor, Jr. et al. |
| 2010/0287288 A1 | 11/2010 | Driscoll et al. |
| 2012/0317261 A1 | 12/2012 | Ahmavaara |
| 2015/0304850 A1 | 10/2015 | Weiner et al. |
| 2016/0189134 A1* | 6/2016 | Voege .................... G06F 21/35 705/44 |
| 2016/0306955 A1* | 10/2016 | Martin .................... G06F 21/34 |
| 2017/0054707 A1 | 2/2017 | Leicher et al. |
| 2018/0103341 A1* | 4/2018 | Moiyallah, Jr. ..... G06F 3/04842 |

OTHER PUBLICATIONS

International Search Report and Written Opinion for International Application No. PCT/US2023/060883, mailed Jun. 15, 2023, 9 pages.

\* cited by examiner

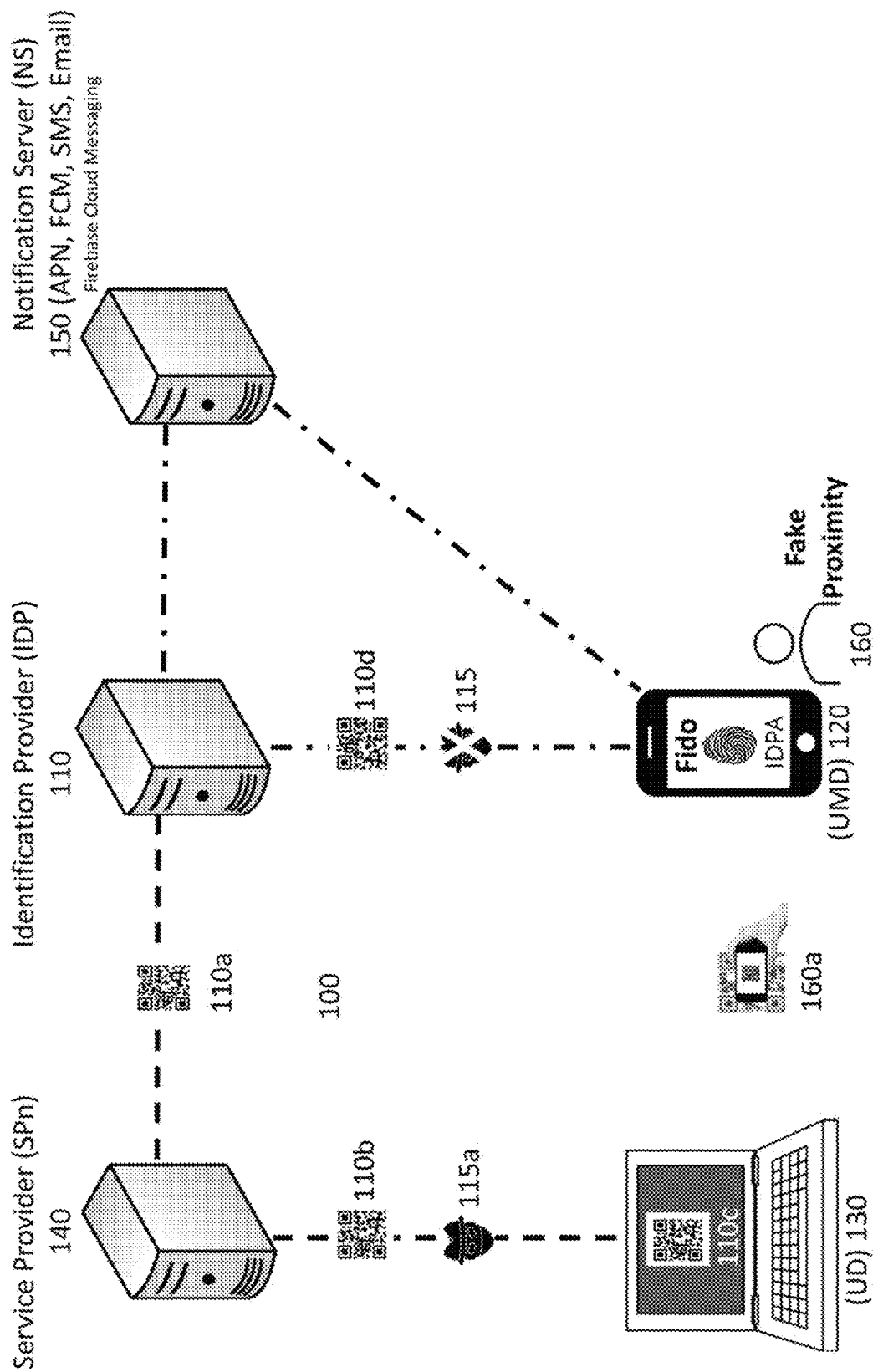

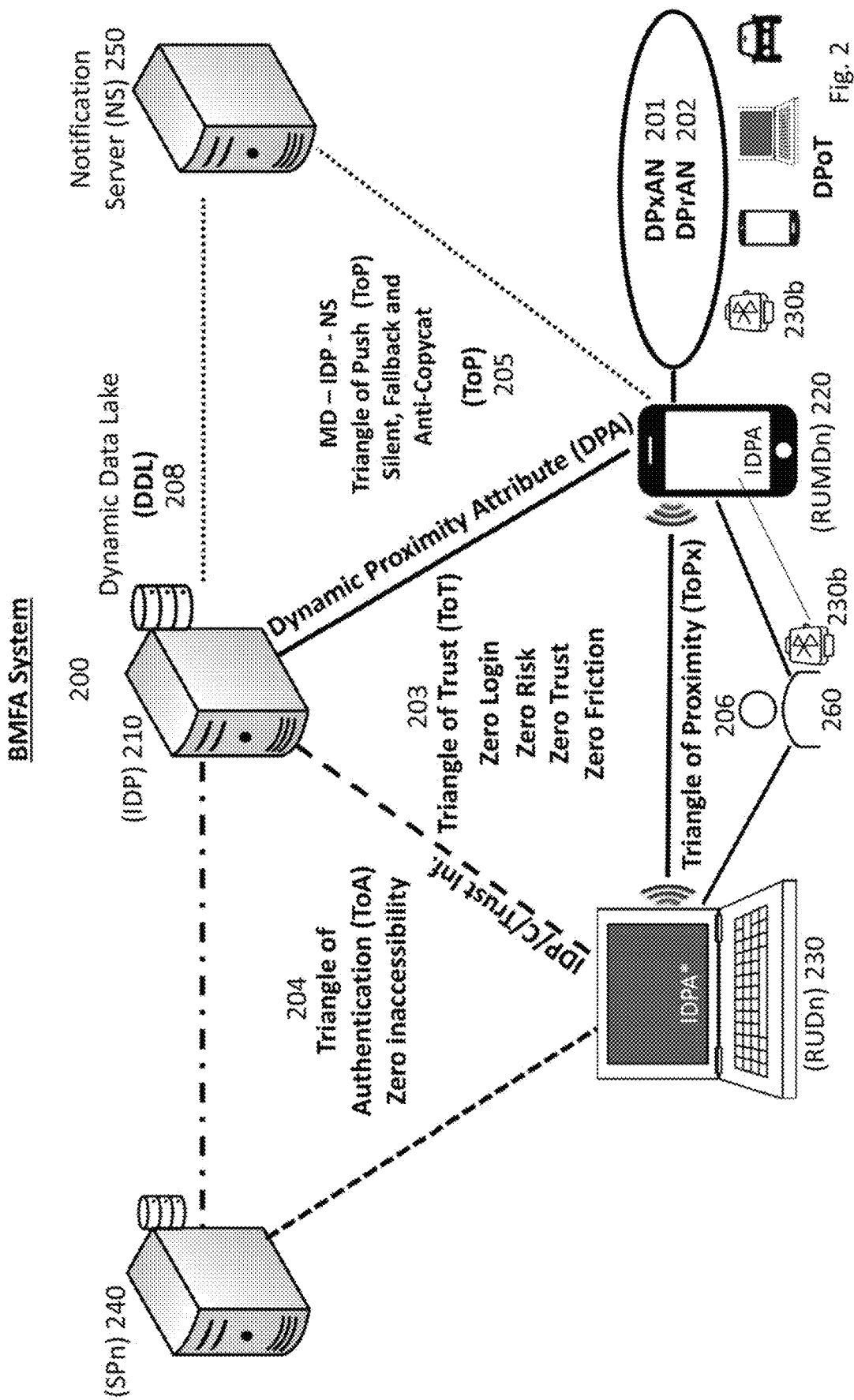

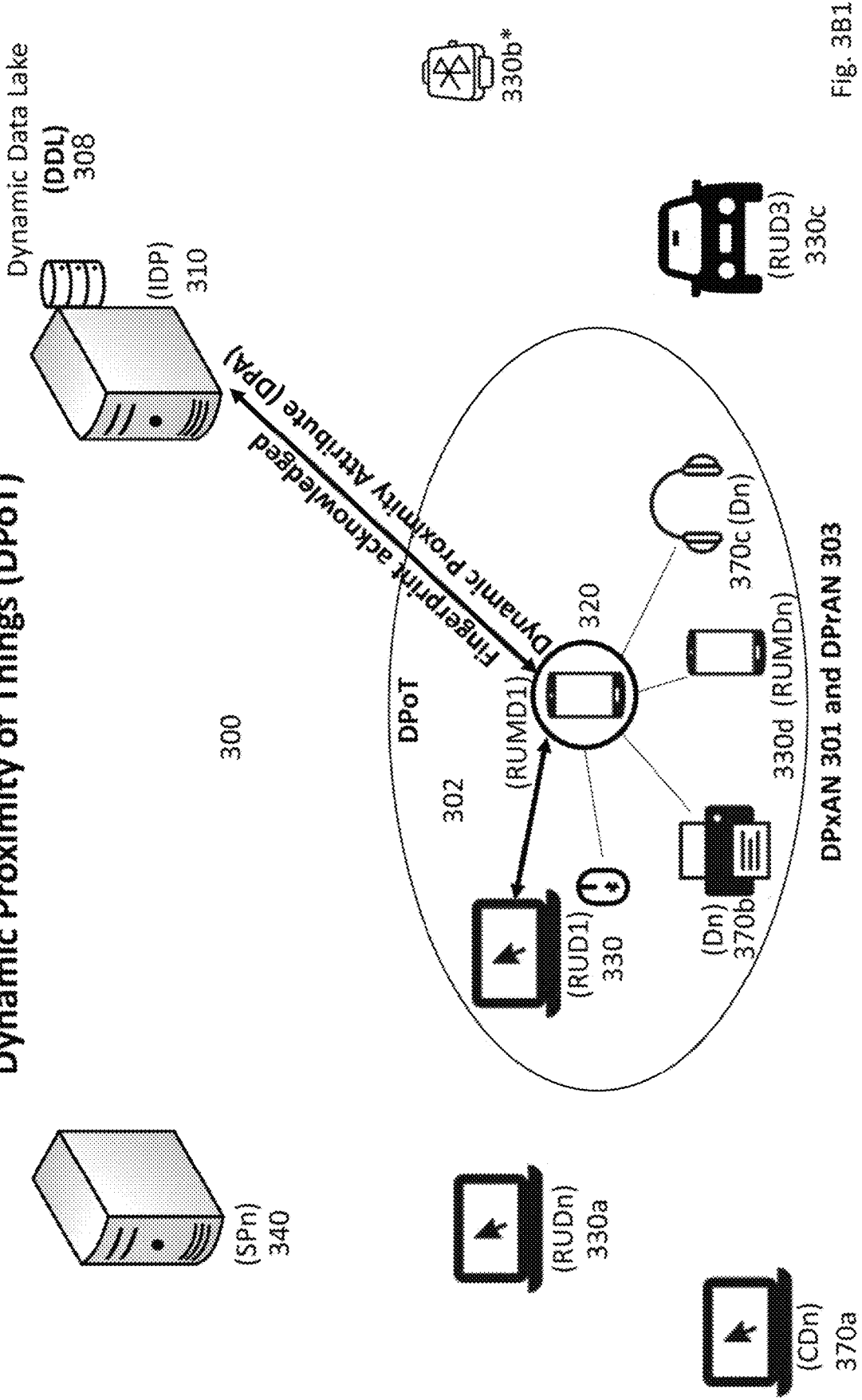
Fig. 3B1

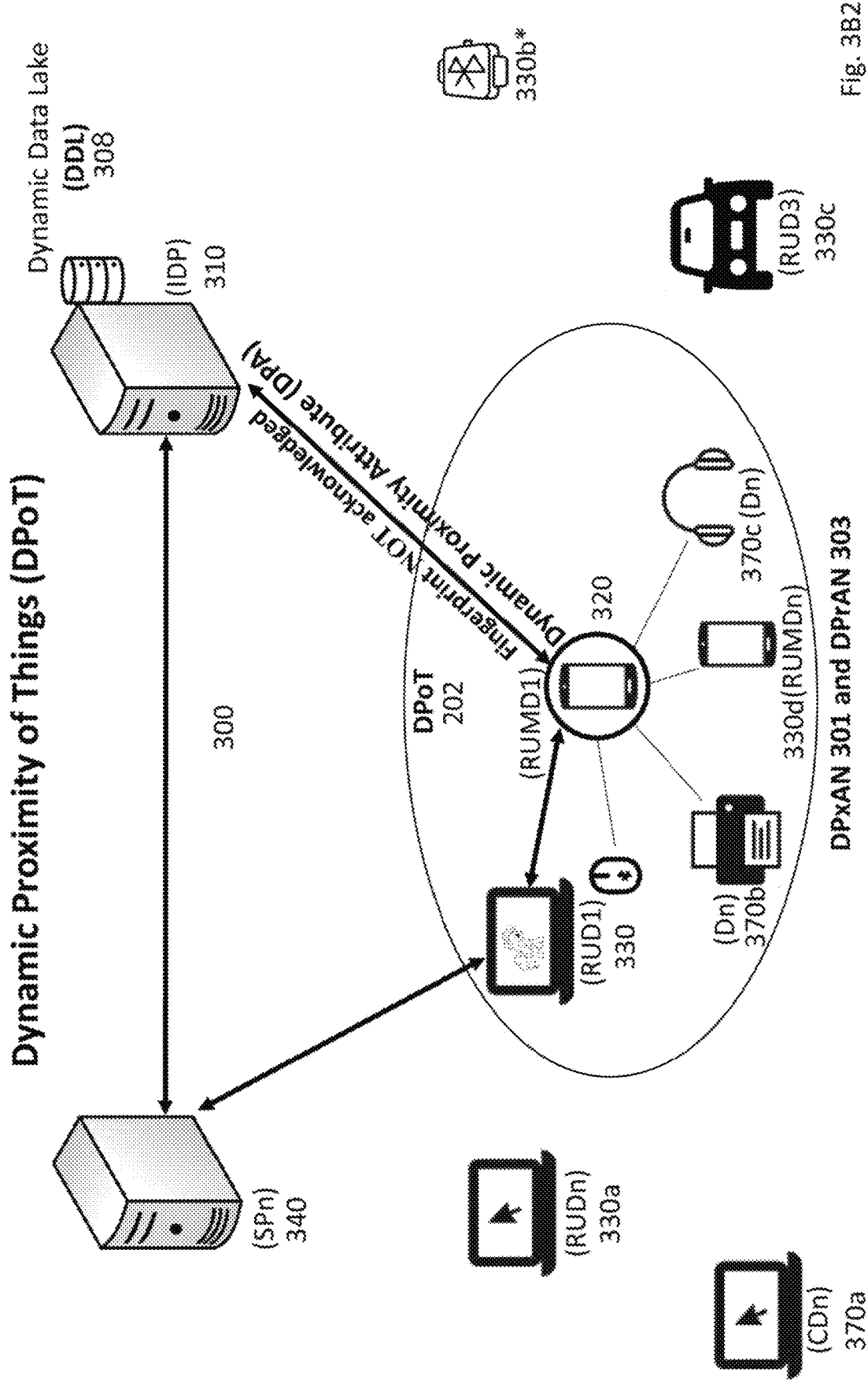
Fig. 3B2

1100

1101 Receive, at an Identity Provider (IDP) and from a registered user mobile device (RUMD) communicably coupled to the IDP, a representation of dynamic proximity attributes (DPA) indicating whether a user is within a predetermined proximity of the RUMD and a registered user device (RUD) based on short-range communication between the RUMD and the RUD, the RUMD configured to monitor devices in short-range communication in a dynamic proximity area network (DPxAN) via an IDP application (DPAmd)

1102 For each SPn, the IDP sends an Inaccessibility token (InaccTok) that is unique to the SP and RUMD (e.g. InaccTok SP1-RUMD1) to the SP and sends a corresponding InaccToken (e.g. InaccTok SP1-RUMD1) to the RUMD. The RUMD is configured to:
(1) store all the unique InaccTokens it receives from the IDP, and
(2) send the unique InaccTok (e.g. InaccTok SP1-RUMD1) to the relevant SP (e.g. SP1) to facilitate passwordless authentication and allow the user to log in to the specific SPn with the corresponding unique InaccToken during an inaccessibility event of the IDP.

Fig. 11 and the RUMD and the RUD. The RUMD is configured to monitor devices in short-range communication in a dynamic proximity area network (DPxAN) via an IDP application (IDPAmd). The processor is further configured to send at least one unique inaccessibility token (InaccTok) to each service provider from a set of service providers and a corresponding InaccTok to the RUMD. The RUMD is configured to (1) store the corresponding InaccTok in response to receiving the corresponding InaccTok and (2) send the corresponding InaccTok to the set of service providers to facilitate passwordless authentication and allow the user to log in to the set of service providers during an inaccessibility event of the IDP.

In an embodiment, a registered user mobile device (RUMD) apparatus includes a memory and a processor operatively coupled to the memory. The processor is configured to monitor at least one device that is in short-range communication in a dynamic proximity area network (DPxAN). The processor is further configured to provide an identity provider (IDP) with risk signals (RS) including a representation of dynamic proximity attributes (DPA) that determine whether a user is in a predetermined proximity with the RUMD and a registered user device (RUD) based on short-range communication (e.g., Bluetooth (BT)) between the RUMD and the RUD, the biometrics acknowledgment, cryptographic signals (e.g., passkeys), and location data. The RUMD is in communication with the IDP and a plurality of service providers. The processor is further configured to attempt to access a service provider from the plurality of service providers. The processor is further configured to send a login request to the service provider. The processor is further configured to send Trust Information (TI) to the IDP that uniquely identifies the RUMD device. The processor is further configured to receive an indication of an access grant from the service provider confirming that the user that is within a predetermined acceptable proximity to at least one RUD that is also in the same DPxAN as the RUMD.

METHOD AND APPARATUS FOR SECURE AUTHENTICATION BASED ON PROXIMITY

CROSS REFERENCE TO RELATED APPLICATIONS

This application claims priority to and benefit of U.S. Provisional Application No. 63/301,206, filed on Jan. 20, 2022 and titled "METHOD AND APPARATUS FOR USING DYNAMIC TRIANGLE OF PROXIMITY (DToPx) FACTOR FOR MULTIFACTOR AUTHENTICATION," the disclosure of which is incorporated herein by reference in its entirety for all purposes.

FIELD

One or more embodiments are related to a method and apparatus for secure authentication based on proximity.

BACKGROUND

Some known multi-factor authentication (MFA) systems are based on authentication factors, including something you know (knowledge factor), something you have (possession factor), or something you are (biometric factor). The disadvantages of such known MFA systems can include passive authentication, push notification attacks and push fatigue, delayed login due to the additional notification service layer, outages due to failures (such as the notification service's inability to deliver push notifications), fake proximity attacks, man-in-the-middle (MITM) QR-code login (QRL) attacks, friction in the user experience, and/or the like. On their own, these authentication factors can be unreliable if they don't have a factor that can determine whether the user requesting access is in physical proximity (liveness) to the registered user device (RUD) that is in communication with the service provider.

SUMMARY

In an embodiment, an identity provider (IDP) apparatus includes a memory and a processor operatively coupled to the memory. The processor is configured to receive, from a registered user mobile device (RUMD) communicably coupled to the IDP, a set of dynamic proximity attribute (DPA) Risk Signals (RS) indicating whether a user is within a predetermined proximity of the RUMD and a registered user device (RUD) based on short-range communication between the RUMD and the RUD. The RUMD is configured to monitor devices in short-range communication in a dynamic proximity area network (DPxAN) via an IDP application (IDPAmd) associated with the RUMD. The processor is further configured to determine a Risk Parameter Value (RPV) according to the DPA RS received from the RUMD. The processor is further configured to receive, from a Service Provider (SPn), a request to authenticate the user at the RUD on which a user access request originated. The processor is further configured to send an authentication response to the SPn based on the RPV.

In an embodiment, an identity provider (IDP) apparatus includes a memory and a processor operatively coupled to the memory. The processor is configured to receive, from a registered user mobile device (RUMD) communicably coupled to the IDP, a representation of dynamic proximity attributes (DPA) indicating whether a user is within a predetermined proximity of the RUMD and a registered user device (RUD) based on short-range communication between

BRIEF DESCRIPTION OF THE DRAWINGS

It is to be understood that other embodiments may be used, and structural changes may be made without departing from the scope of the disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items.

The use of the suffix "n" on a component label is used to indicate one or more of the components.

The accompanying drawings are included to provide a further understanding of the disclosure and are incorporated in and constitute a part of this specification. The drawings illustrate example embodiments of the disclosure and, together with the description, serve to explain the principles of the disclosure.

FIG. 1 is a schematic diagram illustrating an MFA system 100 that is based on various authentication factors, and the disadvantages of various MFA that this disclosure resolves.

FIG. 2 is a schematic diagram illustrating a Beyond MFA (BMFA) system 200, a triangle of trust (ToT) 203, a triangle of authentication (ToA) 204, a triangle of push (ToP) 205 and a triangle of proximity (ToPx) 206, according to an embodiment.

Figure 3A:
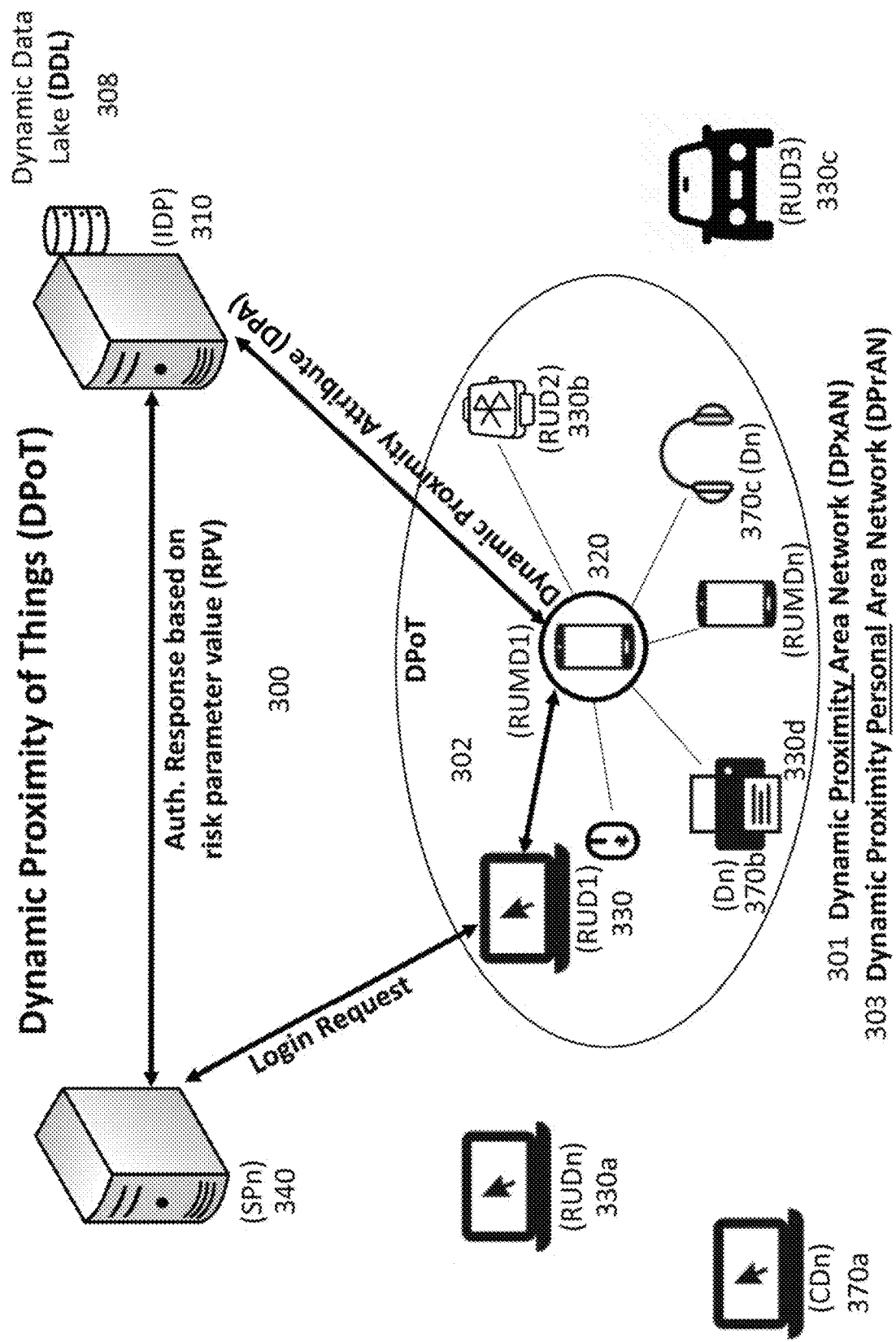

FIG. 3A is a schematic diagram illustrating elements of a Dynamic Proximity of Things (DPoT) network in a system 300, after enrollment of the RUMD and RUD, according to an embodiment.

FIG. 3B1 is a schematic diagram illustrating a structure of the system 300, and an instance of the received DPA at the IDP server 310 when a user's registered watch 330*b\ transitions out of the DPxAN 301, according to an embodiment. The DPA are received by the IDP server 310 and indicate that the user may be outside the perimeter of the Dynamic Personal Area Network (DPrAN) 302** policy. The IDP server responds to the received user fingerprint acknowledgment, according to an embodiment.

FIG. 3B2 is a schematic diagram illustrating the structure of the system 300, and an instance of a received DPA at the IDP server 310 when a user's registered watch 330*b\ transitions out of the DPxAN 301, which is detected by the IDP server 310 that the user may be outside the perimeter of the DPrAN 302** policy, according to an embodiment. The IDP server responds when the user fingerprint acknowledgment is not received, according to an embodiment.

Figure 3C:
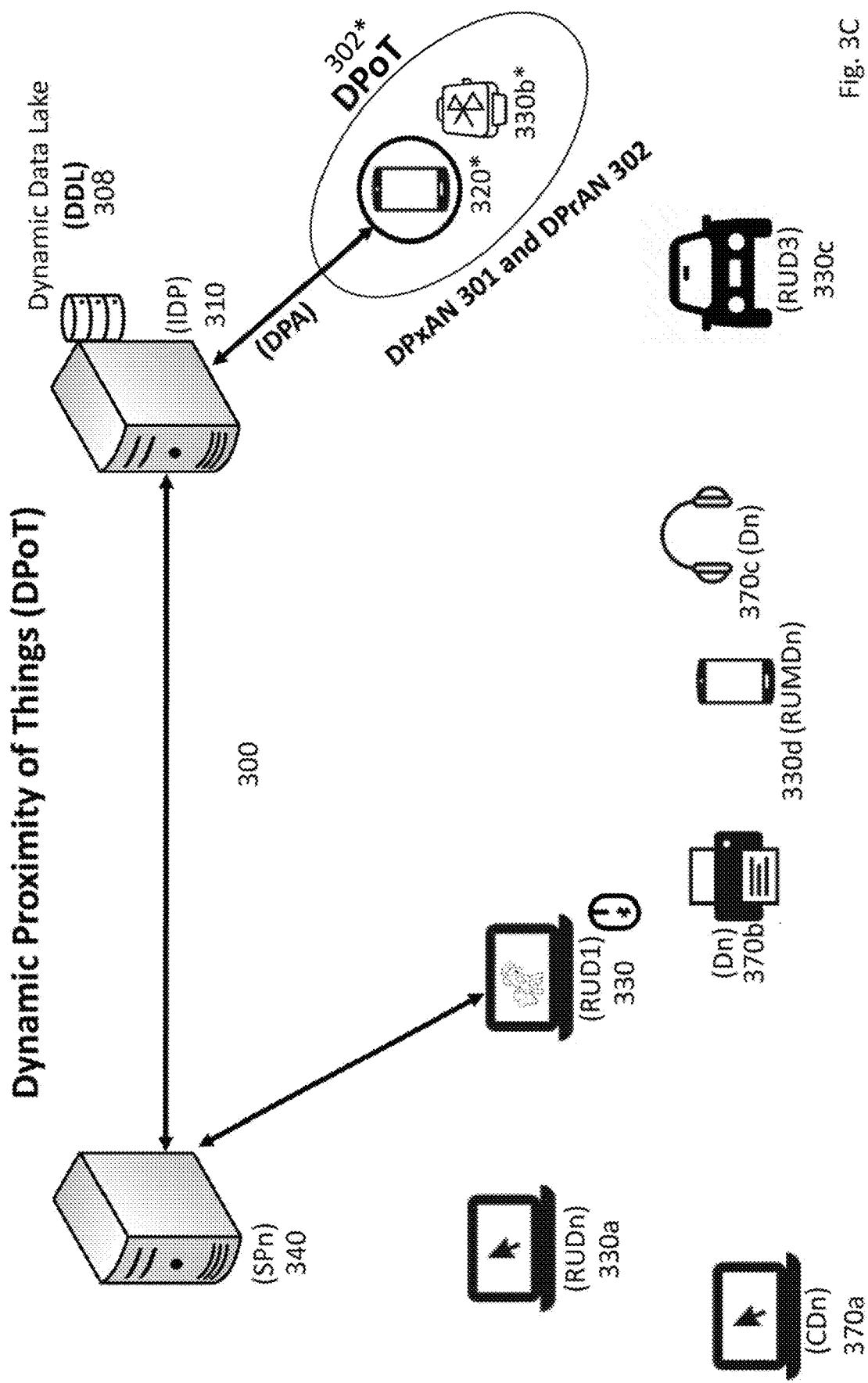

FIG. 3C is a schematic diagram illustrating the structure of the system 300, and an instance of a received DPA at the IDP server 310 when the RUD 330 transitions out of the DPxAN 301\*, which is detected by the IDP server 310 that the user's RUMD 320\* and user's registered watch 330*b\ are not in proximity to RUD 330**, according to an embodiment.

Figure 4:
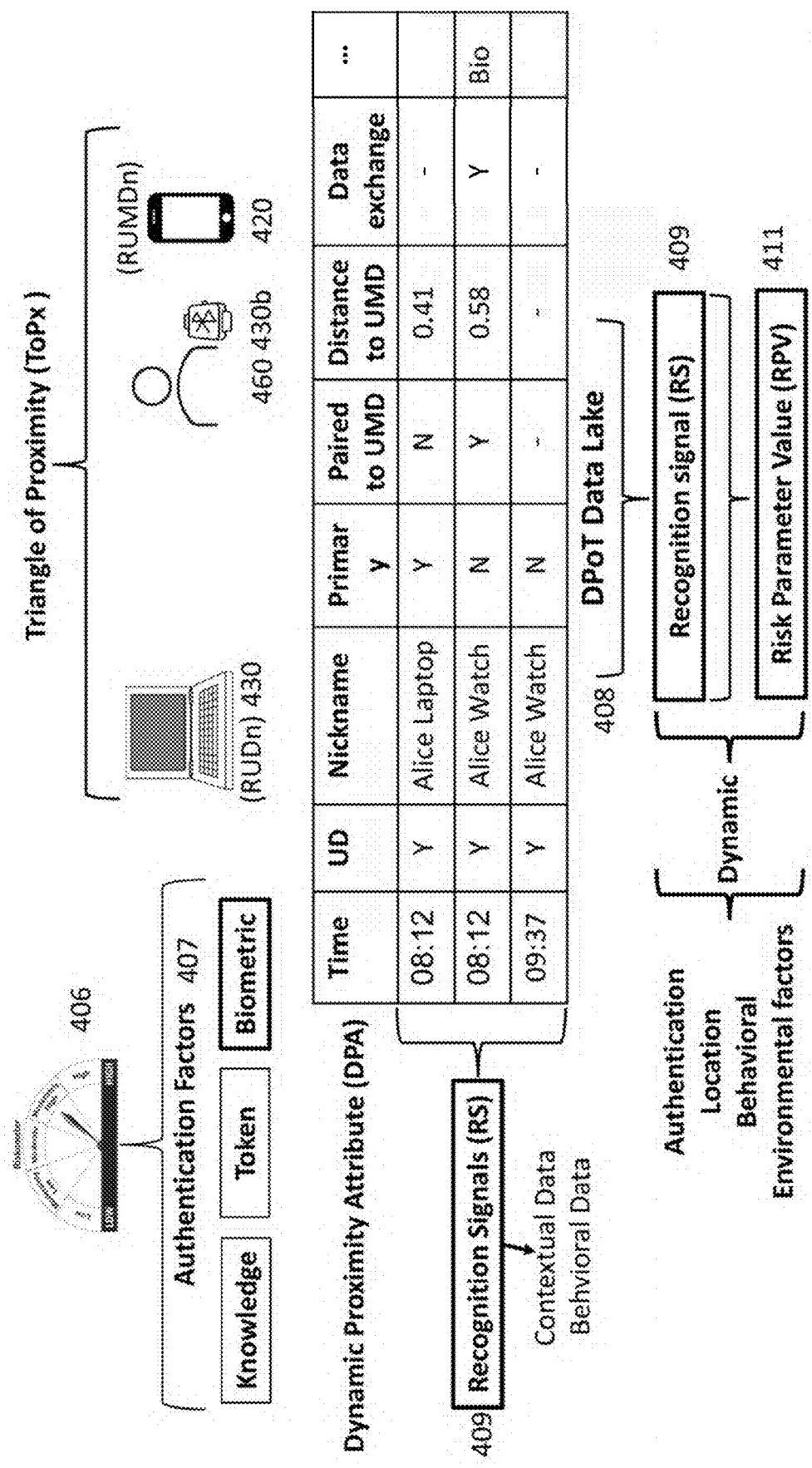

FIG. 4 is an illustration of the repeated collection of DPA RS from the DPoT devices in the DPxAN, according to an embodiment. The DPA RS provide resources to the DPoT Data Lake 408 that are used to calculate and improve the accuracy of the Risk Parameter Value (PRPV) as part of the RPV 411, according to an embodiment.

Figure 5:
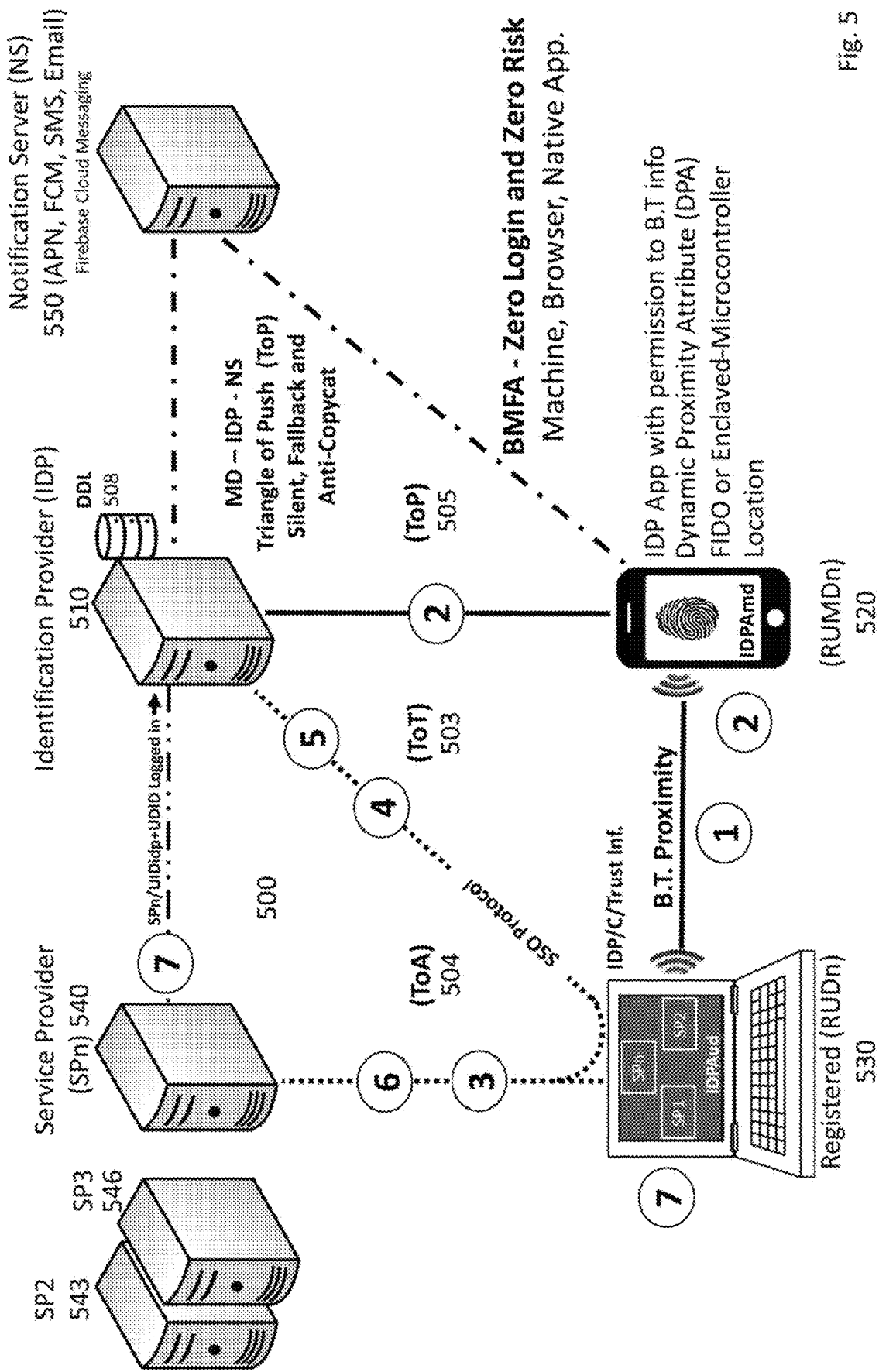

FIG. 5 is a schematic diagram illustrating a zero-login authentication and zero-risk flow, according to an embodiment.

Figure 6:
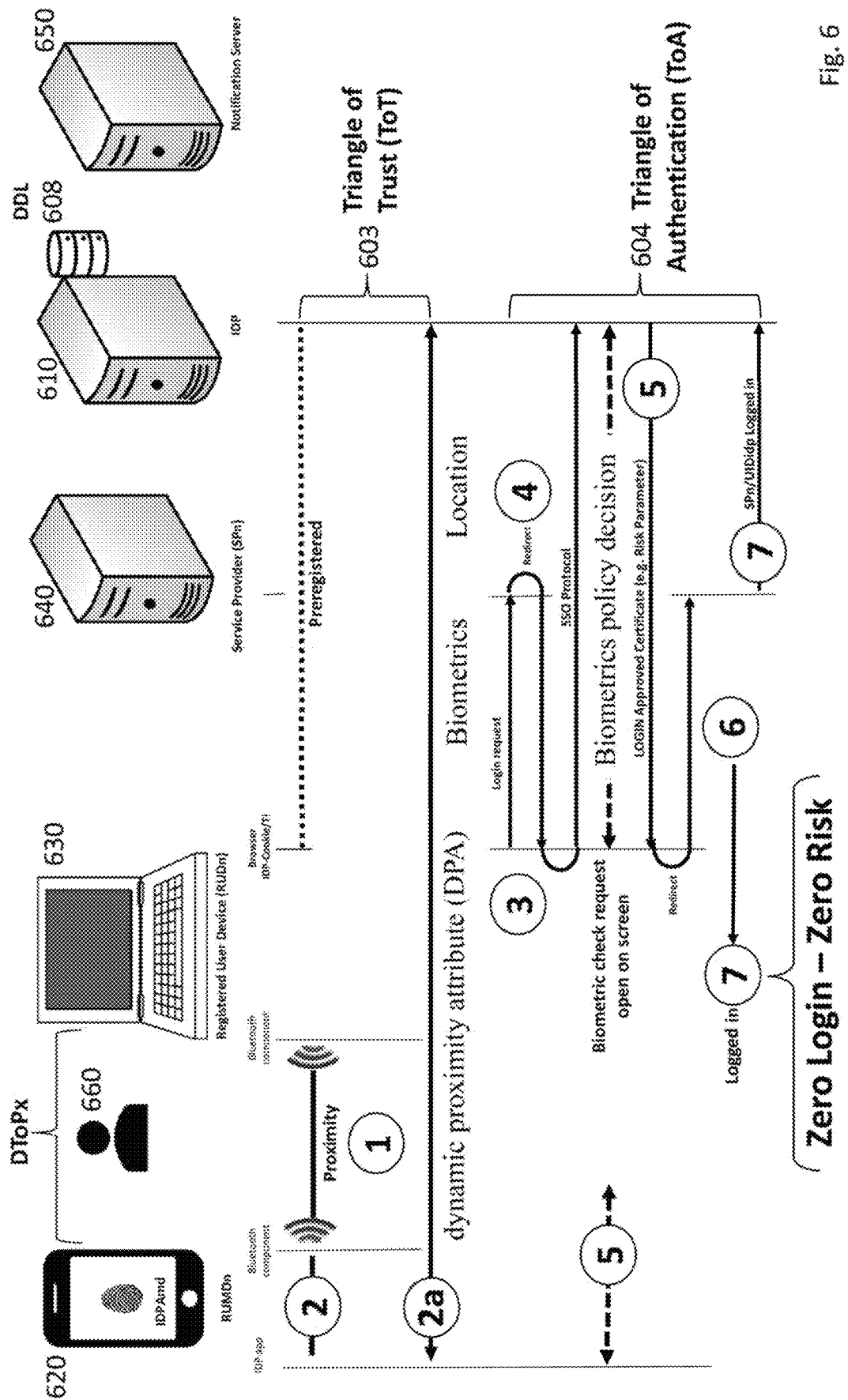

FIG. 6 is a sequence diagram illustrating a zero login and a zero-risk authentication flow according to a triangle of trust (ToT) and a triangle of authentication (ToA), according to an embodiment.

Figure 7:
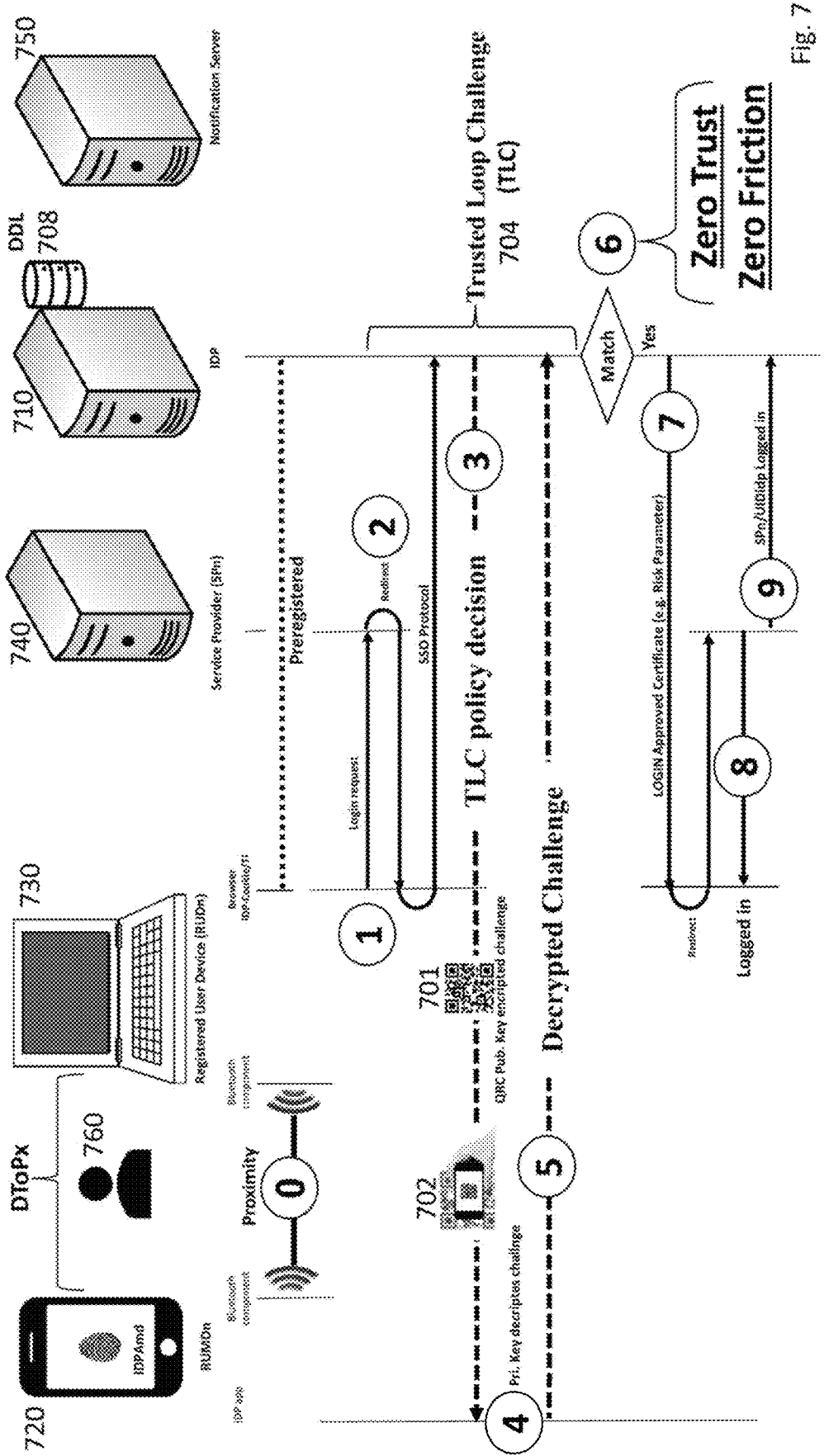

FIG. 7 is a sequence diagram illustrating a Trusted Loop Challenge (TLC) 704 in an authentication flow, according to an embodiment, which results in zero trust with zero friction.

Figure 8:
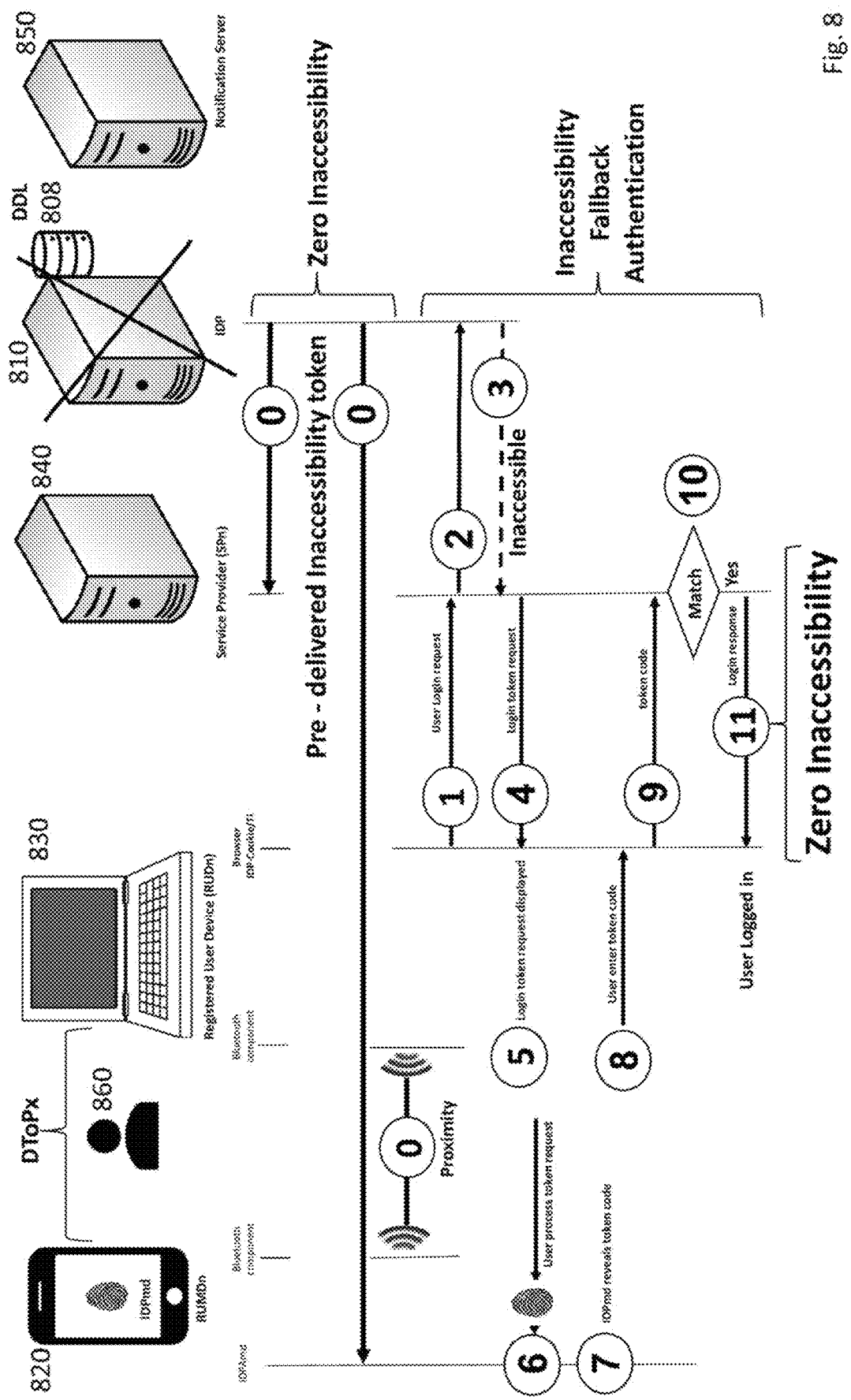

FIG. 8 is a sequence diagram illustrating an inaccessibility event of the IDP server, according to an embodiment, and the zero-inaccessibility authentication flow that enables the user to successfully access the SPn during the inaccessibility event.

Figure 9:
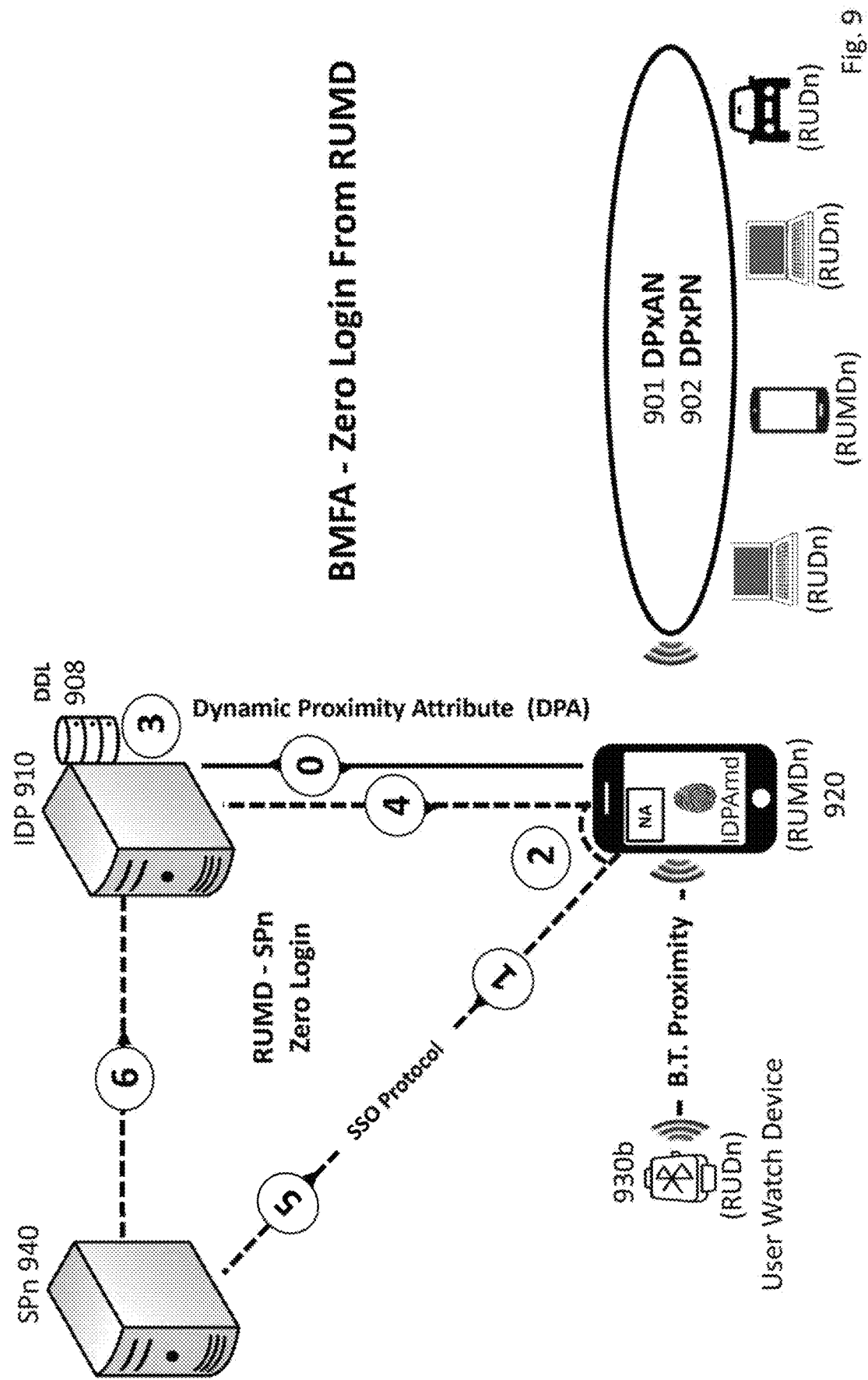

FIG. 9 is a schematic diagram illustrating zero login from the RUMD in a BMFA system, according to an embodiment.

Figure 10:
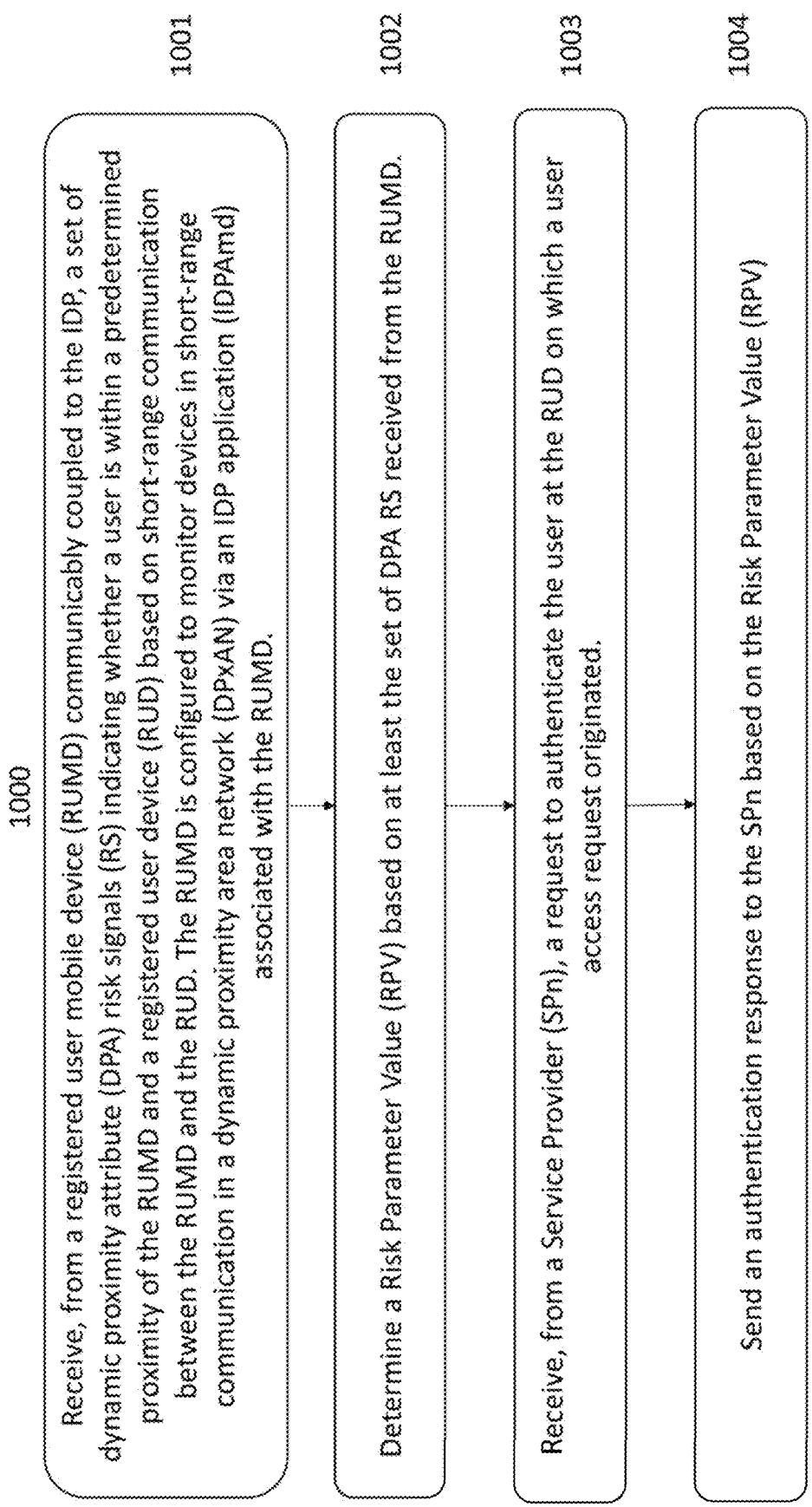

FIG. 10 shows a flowchart of a method 1000 to authenticate a user based on short-range communication between a RUMD associated with the user and a RUD associated with the user, according to an embodiment.

FIG. 11 shows a flowchart of a method 1100 to cause passwordless authentication of a user, according to an embodiment.

Figure 12:
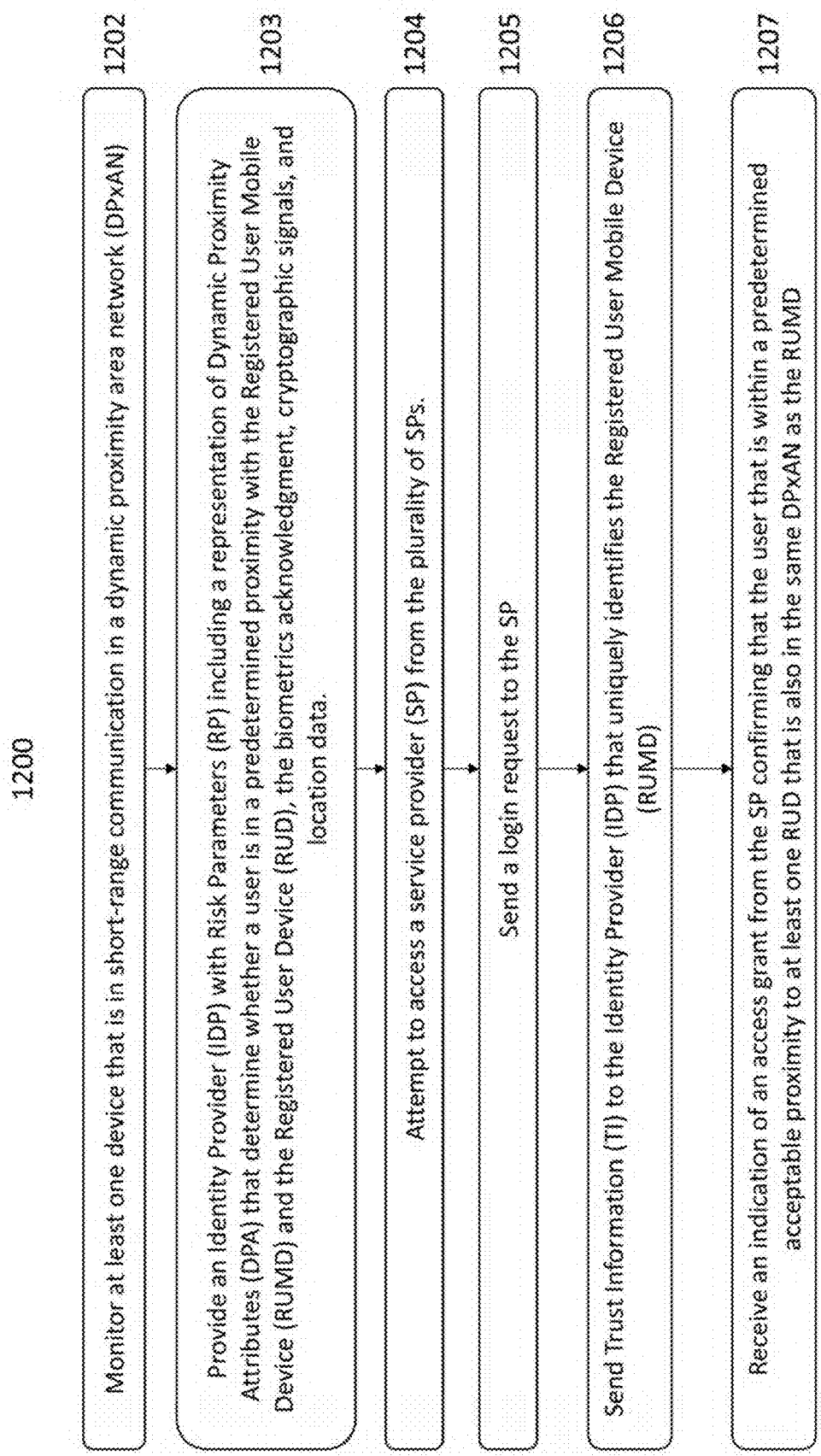

FIG. 12 shows a flowchart of a method 1200 to access a service provider based on short-range communications between a RUMD and an RUD, according to an embodiment.

DETAILED DESCRIPTION

Multifactor authentication (MFA) systems with known authentication factors based on only knowledge, possession, and biometric factors can be vulnerable to attack. Such risks can be mitigated by consideration another factor: the User Proximity Liveness Factor (UPLF).

The Dynamic Beyond MFA (BMFA) system includes a Triangle of Trust (ToT) and Triangle of Proximity (ToPx), providing the UPLF. The BMFA system provides a more robust system, supporting zero and/or reduced login, zero and/or reduced trust, and zero and/or reduced inaccessibility, with zero and/or reduced friction and reduced risk.

The BMFA system is based on a short-range, such as Bluetooth (BT), Dynamic Proximity Area Network (DPxAN) and a short-range, such as BT, Dynamic Personal Area Network (DPeAN) surrounding (e.g., within a predetermined distance of) the Registered User Mobile Device (RUMD).

Repeated, periodic and/or sporadic collection of Dynamic Proximity Attributes (DPA) Risk Signals (RS) from the Dynamic Proximity of Things (DPoT) devices (e.g., laptop, tablet, phone, watch, smart device, and/or the like) in the DPxAN, together with Artificial Intelligence (AI), such as behavioral analytics, can provide data for a Dynamic Data Lake (DDL) to generate (e.g., by a processor) a desirable (e.g., the lowest possible, a reduced, an improved, etc.) Risk Parameter Value (RPV). In some implementations, a DDL is a system or repository of data stored in its natural and/or raw format. In some implementations, a DDL is a memory at an identity provider (IDP) and/or accessible by the IDP.

In some implementations, the system can confirm the user's presence, that their device is bound (e.g., in proximity) (e.g., via BT or any other communication system) and dynamically tracked (e.g., through a liveness check), further reducing the Risk Parameter Value (RPV) through behavioral data from the DDL. The system (e.g., by a processor) can further determine and/or prove that the Identity Provider (IDP) and RUMD are securely bound, through the use of, but not limited to RUMD Trust Information (TI), cryptographic signals, user's biometric verification and/or a ToPx check, to generate an RPV representing the risk the IDP takes when allowing the user entry. The IDP can reuse the RPV for customer access requests from any Service Provider (SP). In some implementations, the RPV is represented by a value, such as a number between 0-1 or a number between 0-100.

Some implementations are related to a BMFA system based on the ToT and ToPx structures, that can provide instantaneous (e.g., at machine speed) and strong user authentication and validation, zero and/or reduced login, zero and/or reduced trust, zero and/or reduced inaccessibility, zero and/or reduced friction, reduced risk and continuous dynamic MFA.

A ToPx verifies that the user requesting the login is in proximity (within a predetermined distance) to the RUD that communicates with the SPn, and is also in proximity to the RUMD, and the user's physical presence is also verified through physical and liveness data.

In some instances, the system may remove the need for something you know (such as a password or passkey that is verified by the SP whether it's password or passkey which the SP can verify), replacing something you know with password-less authentication that is verified by the IDP and not by other devices.

In addition, the BMFA systems disclosed herein, via a processor, monitor, and environmental factors and RS, such as from a DPoT, can analyze by using repeated (e.g., continuous, periodic, sporadic) dynamic RS collected from devices surrounding the RUMD in the DPxAN, to further determine proof of the user's identity, such as, for example, one or more of:

Proof that the user is bound (within a predetermined proximity to the RUMD and the RUD)
Proof of the physical presence and liveness of the user
Proof that the user is dynamically tracked
Proof of the user's DPxAN environment status
The system can, for example, provide:
Zero and/or Reduced Login:

In some implementations, zero and/or reduced login refers to eliminating and/or reducing the necessity for users to recall and provide passwords or perform an action to identify themselves at login. The disclosed systems' intelligence can be smart and secure enough to recognize users (e.g., substantially instantly and automatically), according to unique RS (e.g., cryptographic signals, passkeys, and behavioral data) without challenging the user (e.g., requesting a username and password). The disclosed systems can permit the user access to SPn-requested services when appropriate and can notify the SPn when the user account should be disconnected.

Zero and/or Reduced Trust:

In some implementations, zero and/or reduced trust refers to verification of users, and validation of devices, intelligently monitoring, tracking and controlling access.

Zero and/or Reduced Inaccessibility:

In some implementations, zero and/or reduced inaccessibility refers to providing a secure automatic fallback mechanism in the event of IDP inaccessibility. The disclosed systems can deliver strong authentication and an InaccTok, substantially immediately after strong authentication of the user, leveraging the strength of the ToPx RS, biometric RS (e.g., fingerprint, face, etc.) validation, location RS, and user behavioral data; the system matches the InaccTok retrieved from the RUMD with the InaccTok stored at the SPn provided by the IDP. This removes use of the traditional one-time passcodes (OTP) and their complications.

Zero and/or Reduced Friction:

In some implementations, zero and/or reduced friction refers to a more transparent and more effortless user experience, without compromising on security.

Reduced Risk:

In some implementations, reduced risk refers to reducing or eliminating the potential for security breaches due to vulnerabilities of some known MFA systems.

Offline Authentication:

Permits strong authentication even when offline.

The disclosed systems can include an IDP in communication with the RUMD and further in communication with the RUD in some implementations.

In some implementations, the RUMD can further include an IDPAmd that can monitor BT RS from the DPoT surrounding the RUMD in the DPxAN in some implementations.

In some implementations, the IDPAmd enables providing the IDP the DPA and determining whether the user, the RUMD and the RUD are in proximity, based on BT short range communication between the RUD and the RUMD supervised by the IDPAmd.

In some implementations, during the enrollment, the IDPAmd further provides to the IDP, the RUMD RS (e.g., the Media Access Control (MAC) address of the BT component in the RUDn 530). During enrollment, the RUD, via a processor, provides to the IDP: Trusted Information (TI) such as but not limited to the hardware and software fingerprint of the device, the browser fingerprint, cryptographic signals, the BT MAC address of the RUD, and an IDP cookie which is gathered to uniquely identify the RUD, and to provide a characterization of the user attempting to access to the SPn.

In some implementations, the IDP receives, via a processor and from the SPn, a request to authenticate a user who is in proximity to the RUD where the login request originated.

In some implementations, the IDP determines (e.g., calculates), via a processor, the RPV, according to the RS received from the RUMD, which include but are not limited to DPA RS, biometrics RS, cryptographic signals, and location information RS.

In some implementations, according to the TI received from the RUMD, which uniquely identifies the RUMD, the TI received from the RUD, which uniquely identifies the RUD, and the user identifier provided by the IDP (UIDidp), the IDP identifies, via a processor, that the TI received from the RUD, and that at a minimum, the BT MAC address in the TI received from the RUMD matches the BT MAC address of the RUD requesting access, that is in BT connection with the RUMD and which provides the BT MAC address of the accessing RUD.

In some implementations, the IDP authenticates, via a processor, the user and transmits the authentication and the RPV to the SPn to validate the user access from the RUD.

In some implementations, the systems and methods described herein relate to a BMFA system based on the DPoT structure that provides user authentication and validation, zero and/or reduced log-in, zero and/or reduced trust, zero and/or reduced inaccessibility, zero and/or reduced friction, reduced risk, and continuous dynamic MFA.

Some known MFA systems are based on authentication factors, including something you know (knowledge factor), something you have (possession factor), and something you are (biometric factor).

The disadvantages of such known MFA systems can include, for example:

Passive authentication
Push notification attacks and push fatigue
Delayed login due to the additional notification service layer
Outages due to failures, such as the notification service's inability to deliver push notifications
Fake proximity attacks
Man-in-the-middle (MITM) QR-code login (QRL) attacks
Friction in the user experience On their own, these authentication factors can be unreliable if they don't have a factor that can determine whether the user requesting access is in physical proximity (liveness) to the RUD that is in communication with the service provider.

Since the known MFA authentication factors may sometimes include a hidden and false proximity parameter, a true and accurate proximity parameter can be desirable for authenticating the user.

In addition, in some known MFA systems, the IDP can only start the authentication procedure after it receives the request to authenticate the user, which can take time and cost. On the other hand, in some implementations of a BMFA system, the IDP calculates and updates the RPV, based on RS continuously, repeatedly, periodically and/or sporadically collected from the RUMD and RUD, and uses the RPV to provide substantially instantaneous and more robust authentication, while eliminating the SP from the authentication process (e.g., with an additional password or passkey authentication step). The RPV that is calculated by the IDP can be reused to enable the user of the RUD to access any SP through a Single Sign On (SSO) model, in some implementations.

The addition of a comprehensive proximity factor, and substantially instantaneous authentication together with further improvements described herein can significantly improve the performance of such traditional MFA systems and overcome the disadvantages detailed herein.

In some embodiments, the systems described herein relate to an BMFA system based on the ToT and ToPx structures, that can provide instantaneous and strong user authentication and validation, zero and/or reduced login, zero and/or reduced trust, zero and/or reduced inaccessibility, zero and/or reduced friction, reduced risk and continuous, periodic and/or sporadic dynamic MFA.

A ToPx verifies that the user requesting the login is in proximity to the RUD that communicates with the SPn, is in proximity to the RUMD, and that the user's physical presence is also verified through physical and liveness data.

In some implementations, the systems described herein may remove at least the need for the known MFA factor of something you know (such as a password or passkey that must be verified by the SP whether it's password or passkey which the SP as to verify), replacing it with password-less authentication that is verified by the IDP.

In some implementations, a first device prompting, communicating, notifying, providing, sending, receiving, and/or the like with a second device can include causing, via a processor of the first device, to send an electronic signal from the first device to second device.

FIG. 1 is a schematic diagram illustrating an MFA system 100 that uses various authentication factors. Referring to FIG. 1, the MFA system 100 includes the IDP server 110, the UMD 120, the UD 130, the SPn server 140 and a Notification Server (NS) 150. A user 160 can interact with various devices in the MFA system 100. FIG. 1 illustrates three scenarios: A first MFA implementation, a second scenario where a fraudster uses stolen user credentials causing fake proximity jacking, and a third scenario using a QR code as zero and/or reduced login and causing MITM QRL jacking.

FIG. 1 illustrates an example of a scenario in the MFA system 100. A user 160 submits credentials and a request from the UD 130 to the SPn 140 to access a protected resource. Based on the user credentials, the SPn 140 issues a request to the IDP 110 to authenticate user 160. The IDP 110 issues a request to the NS 150 to send a notification to the IDPAmd on the user's specified UMD 120. Based on a user action, such as a fingerprint scan, the IDPAmd authenticates the user 160 and notifies the IDP 110. The IDP notifies the SPn 140 of the user authentication. The SPn 140 permits the user access to its resources from UD 130. The MFA system 100 suffers from disadvantages including passive authentication, push notifications attack "Push fatigue", notification slow login, notification outage and poor user experience.

FIG. 1 illustrates a scenario of fake proximity jacking. A fraudster submits stolen credentials in a request from a fraudster Client Device (CD) (not shown in FIG. 1) or from a UD 130 to the SPn 140 to access a protected resource (e.g., file, access to a software, access to an account, access to a website, access to a service provided by a website, and/or the like). Based on the stolen user credentials, the SPn 140 issues a request to the IDP 110 to authenticate user 160. The IDP 110 issues a request to the NS 150 to send a notification to the IDPAmd on the user's UMD 120. Due to habit, the user unwittingly provides the required user action, such as a fingerprint scan, although the user did not request the login and may be far away from UD 130. The IDPAmd authenticates the user 160 and notifies the IDP 110. The IDP 110 notifies the SPn 140 of the user authentication. The SPn 140 permits the fraudster access to its resources from UD 130 or from the fraudster CD (not shown in FIG. 1).

FIG. 1 illustrates another scenario using the MFA system 100, where a zero and/or reduced login mechanism is applied. A user 160 submits a request from the UD 130 to the SPn 140 to access a protected resource. The SPn 140 issues an authentication request to the IDP 110. The IDP 110 returns a Quick Response (QR) code 110a to the SPn 140, that the SPn 140 returns as QR code 110b to the UD 130 for display on its screen as QR code 110c. The user 160 scans QR code 110c on the UD 130 screen using the IDPAmd 160a on the user's UMD 120, indicating that the user 160, the UMD 120 and the UD 130 are at the same location. The IDPAmd submits the QR code 110d to the IDP 110. The IDP 110 verifies that the QR code 110d received from the UMD 120 matches the QR code 110a sent to the SPn 140 and authenticates the user 160. The SPn 140 permits the user 160 access to its resources from UD 130.

FIG. 1 further illustrates an example of an MITM Quick Response Code Login (QRL) jacking. A user 160 receives a phishing page link from a fraudster 115a and accesses it from UD 130. The fraudster 115a requests a login from the SPn 140, the SPn 140 requests a login from the IDP 110, in response the IDP 110 sends to the SPn 140 a QR code 110a which the SPn 140 submits as QR code 110b to the fraudster 115a who requested the login, and the fraudster 115a submits the QR code 110c to the phished UD 130 which displays the phishing page QR code 110c that the user 160 scans with the targeted IDPAmd on UMD 120, which transmits it to the IDP 110 as QR code 110d to authenticate the user 160. The fraudster 115a uses the authentication to access the user's protected resource on the SPn 140. This is the MITM attack QRL (Quick Response Login) jacking.

FIG. 1 also reveals some disadvantages of the MFA system 100 based on traditional authentication factors—something you know (knowledge factor), something you have (possession factor) and something you are (biometric factor). Some disadvantages of traditional MFA can include passive authentication, push notification attacks, delayed login due to the additional notification service layer, outages due to notification service failures, fake proximity attacks, man-in-the-middle (MITM) QR-code login attacks and poor user experience.

FIG. 2 is a schematic diagram illustrating a BMFA system 200 combining 4 triangles, according to an embodiment. The triangle of trust (ToT) 203, the triangle of proximity (ToPx) 206, the triangle of authentication (ToA) 204 and the triangle of push (ToP) 205 are the basis of the BMFA system 200.

The ToT 203 and the ToPx 206 can be utilized for BMFA, and include the IDP 210, the RUMDn 220, the RUDn 230 and the user 260.

The stability and the security strength of the ToT 203 in the system 200 can be based on Short Range Communication (SRC) (e.g., Bluetooth) between the RUMDn 220 and the RUDn 230, and between both the RUMDn 220 and the RUDn 230 with the IDP 210 over Long Range Communication (LRC). Although the discussions herein will discuss BT SRC, it can be appreciated that other SRC types can be used in other implementations, such as but not limited to ultra-wideband and/or Wi-Fi.

The ToT 203 and ToA 204 can use a prior registration process (not shown in FIG. 2) of the user's RUMDn 220 and IDP 210, wherein a cryptographic security layer can be added to the communication channel between the IDP 210 and the RUMDn 220, and wherein IDPurl/Cookie/Trust Information (IDPurl/C/Trust Inf) can be issued by the RUDn 230 to the IDP 210.

In an embodiment where the ToT 203 includes the IDP 210 in communication with the RUMDn 220 via an IDP Application (IDPAmd) and the RUDn 230, there can be short-range communication (e.g., BT) pairing between the RUMDn 220 and the RUDn 230. According to a predetermined policy that may include but is not limited to defining which information collected by the IDPAmd is significant enough (crucial or important enough) to be communicated to the IDP 210 (in order to reduce load on the IDP 210), and defining which parameters are required to establish a Trusted Loop challenge (TLC) for a strong security check of the TOT 203, and with what frequency the TLC or other check is required (as explained in further detail in FIG. 7).

In further reference to FIG. 2, the ToPx 206 in the BMFA system 200 is based on the BT SRC between the RUMDn 220 and the RUDn 230, and between both the RUMDn 220 and the RUDn 230 with the user 260. For example, the user 260 is normally in proximity to his RUMDn 220 and the proximity of the user 260 to the RUMDn 220 can be checked by user biometrics submitted to the RUMDn 220, via a watch 230*b* worn by the user, and/or the like; and since the RUMDn 220 is in BT proximity with the RUDn 230, therefore it can also be determined by the IDP 210 that the user 260 (via the watch 230*b*) is in proximity to the RUDn 230. The stability and the security strength of the ToPx 206 depends on the user 160, the RUMDn 220 and the RUDn 230 being in proximity with each other. Changes in the ToPx 206 structure is tracked by the IDPAmd which, through a predetermined policy determines whether to send information such as but not limited to DPA from the RUMDn 220 to the IDP 210. If at least one of the three elements that make up the TOPx is no longer in proximity with the other two, the ToPx 206 does not exist and the IDP 210 increases the RPV that the IDP 210 communicates to the SPn 240.

In further reference to FIG. 2, the ToA 204 in the BMFA system 200 can be based on the ToT 203 and the secured communication between the IDP 210 and the RUDn 230, including IDPurl/Cookie/Trust Information (IDPurl/C/Trust Inf), where the IDPurl/C/Trust Inf is issued by the IDP 210 to the RUDn 230. The ToA 204 is described in further detail in FIG. 5 and FIG. 6.

In further reference to FIG. 2, the ToP 205 in the system 200 can be based on the ToT 203 and the secured communication between the IDP 210 and the RUMDn 220. The ToP 205 provides a push notification to the RUMDn 220 for silent authentication, fallback in the event of redirect failure, and to prevent anti-copycat attacks.

FIG. 3A is a schematic diagram illustrating the DPoT 302 after enrollment of the RUMD1 320 and RUD1 330. The DPxAN 301 and the Dynamic Proximity Personal Area Network (DPrAN) 303 includes the DPoT 302. The DPoT 302 includes the user's RUMD1 320, which determines the DPxAN 301 that contains the RUD1 330. The DPoT 302 can also include any BT device (or other short range wireless device) that is in communication with the RUMD1 320 and includes registered BT devices: a user's registered watch RUD2 330*b*, a user's registered user mobile device (RUMDn) 330*d* and non-registered devices: a printer device (Dn) 370*b* and a headset device (Dn) 370*c*. FIG. 3A also illustrates registered BT devices that are not in proximity to the RUMD1 320 and are not in the user's DPxAN 301: RUDn 330*a*, RUD3 330*c* and client device (CDn) 370*a*.

In further reference to FIG. 3A, the IDPAmd on a user's RUMD1 320 continuously, sporadically, periodically and/or repeatedly monitors the user's DPxAN 301, providing the IDP 310 the DPA determining whether the RUMD1 320 and the RUD1 330 are in proximity, based on BT short range communication between the RUMD1 320 and the RUD1 330 and supervised by the IDPAmd. The IDP receives, via a processor and from an SPn 340, an electronic signal indicating a request to authenticate the user who is in proximity to the RUD1 330 from which the access request originated. The IDP 310 determines the RPV according to the received DPA from the RUMD1 320 and transmits the RPV to the SPn 340 to authenticate the user. In an embodiment, the DPA includes indication that the DPxAN 301 includes a user's registered watch RUD2 330*b* and a second user registered mobile device (RUMDn) 330*d* in proximity to both the RUMD1 320 and the RUD1 330 and can add weight to the resulting RPV. The IDP 310 receives, via a processor, DPA RS (Risk Signals) from the DPoT 302 and stores them in the DDL 308. In some implementations, the DDL 308 is a memory included in and/or accessible by the IDP 310. The DPA RS provides rich behavioral data that may include but are not limited to biometric signals, cryptographic signals, and location signals (e.g., Global Positioning System (GPS) data and/or cellular network location-based data), and can be harnessed by the Artificial Intelligence (AI) and/or Machine Learning (ML) model(s) included in the IDP 310 to calculate a highly accurate RPV (e.g., that can be represented as a percentage score, or a measurable category such as high, medium or low risk, etc.).

The AI and/or ML models can be included in a memory of the IDP 310 and trained to calculate the RPV. In some implementations, the AI and/or ML model is a neural network, a decision tree, a random forest, a Bayesian classifier, a reinforcement learning classifier and/or any other suitable AI and/or ML model. In some instances, the AI and/or ML model is a neural network, and the neural network is trained using a set of representations of DPA RS as input learning data and an associated RPV for each DPA RS from the set of DPA RS as target learning data. In some implementations, the RPV can be calculated using a look up table. In some implementations, the AI and/or ML model can be configured to determine analytics based on contextual data and/or behavioral data stored in the DDL to generate the RPV for the authentication response. For example, the AI and/or ML model can generate the RPV based on biometric signals, cryptographic signals, location signals, and/or the like.

FIG. 3B1 is a schematic diagram illustrating the structure of the system 300, and an instance of a received DPA at the IDP server 310 when a user's registered watch 330*b  transitions out of the DPxAN 301, which is detected by the IDP 310 that the user may be outside the perimeter of the DPxAN 301 and the DPrAN 303**.

For clarification, in FIG. 3A, the user's registered watch RUD2 330*b* was in the user's DPxAN 301, whereas in the instance in FIG. 3B1 the user's registered watch RUD2 330*b has transitioned out of the DPxAN 301**.

In further reference to FIG. 3B1, the IDPAmd on a user's RUMD1 320 continuously, sporadically, periodically and/or repeatedly monitors the user's DPxAN 301, providing the IDP 310 a DPA determining that the RUMD1 320 and the RUD1 330 are in proximity, and that the user's registered watch RUD2 330*b is no longer in proximity to the RUMD1 320 and the RUD1 330. For example, the IDPAmd receives signals from the RUD1 330 via short-range communication indicating whether or not the RUMD1 320 and RUD1 330** are in proximity. Thereafter, the IDPAmd can cause the RUMD1 320 to send a signal to the IDP 310 indicating whether or not the RUMD1 320 and RUD1 330 are in proximity.

In some implementations, the IDP 310 may not be able to determine whether the user is wearing the registered watch RUD2 330b* and has moved away from the RUMD1 320, or whether the user remained at the RUMD1 320 and the registered watch RUD2 330b* transitioned out of the DPxAN 301 for another reason (e.g., someone else moved the RUD2 330b*). The IDP 310 sends a signal to the IDPAmd on the user's RUMD1 320 to prompt the user to provide an indication (e.g., scan a fingerprint, scan a face, etc.) to verify user proximity to the RUMD1 320. Receipt of the indication (e.g., user fingerprint acknowledgment, facial recognition acknowledgment, etc.) at the IDP 310 from the IDPAmd at the RUMD1 320 provides verification that the user is physically in proximity to the RUMD1 320 and the RUD1 330. On verification, the IDP 310 permits the user to continue the session with SPn 340, so RUD1 330 can access the resources without interruption.

FIG. 3B2 is a schematic diagram illustrating the structure of the system 300, and an instance of a received DPA at the IDP server 310 when a user's registered watch 330b* transitions out of the DPxAN 301, which is detected by the IDP server 310 that the user may be outside the perimeter of the DPxAN 301 and DPrAN 303.

For clarification, in FIG. 3A, the user's registered watch RUD2 330b was in the user's DPxAN 301, whereas in FIG. 3B2 the user's registered watch RUD2 330b* has transitioned out of the DPxAN 301.

In further reference to FIG. 3B2, the IDPAmd on a user's RUMD1 320 continuously, sporadically, periodically and/or repeatedly monitors the user's DPxAN 301, providing the IDP 310 a DPA determining that the RUMD1 320 and the RUD1 330 are in proximity, and that the user's registered watch RUD2 330b* is no longer in proximity to the RUMD1 320. The IDP 310 may not be able to determine whether the user is wearing the registered watch RUD2 330b* and has moved away from the RUMD1 320, or whether the user remained at the RUMD1 320 and the registered watch RUD2 330b* is out of the DPxAN 301 for another reason (e.g., someone else moved the RUD2 330b*, the user left the RUD2 330b* elsewhere, etc.). The IDP 310 sends a signal to the IDPAmd on the user's RUMD1 320 to prompt the user to provide an indication (e.g., scan a fingerprint, scan a face, etc.) at the RUMD1 320 to verify user proximity to the RUMD1 320. Absence of receipt of an indication (e.g., user fingerprint acknowledgement, facial recognition acknowledgment, etc.) at the IDP 310 from the IDPAmd at the RUMD1 320 may indicate that the user is not physically in proximity to the RUMD1 320. In such instances, the RPV may not comply with the policy (e.g., the RPV is outside a predetermined acceptable range). The IDP 310 communicates to the SPn 340 that the user is not in proximity to the RUD1 330 that is in communication with the SPn 340. The SPn 340 sends a notification to the RUD1 330 and blocks (e.g., by displaying an image on the screen) further access of the SPn 340 by the RUD1 330 while the user is not in proximity to both the RUMD1 320 and the RUD1 330.

FIG. 3C is a schematic diagram illustrating the structure of the system 300, and an instance of a received DPA at the IDP 310 when the RUD1 330 transitions out of the DPxAN 301*, which is detected by the IDP 310 that the user's RUMD1 320* and user's registered watch 330b* are not in proximity to RUD1 330. In some instances, RUMD 320* and/or user's registered watch 330b* are configured to be in short range communication with RUD1 330. In response to determining that RUMD 320* and/or user's registered watch 330b* are not in proximity with RUD1 330 (e.g., the determined distance is greater than a predetermined threshold, attempts to communicate via the short range technique fail, and/or the like), the IDP 310 can receive a signal representing the DPA from RUMD 320* user's registered watch 330b* and/or RUD1 330 and indication that the user's RUMD1 320* and user's registered watch 330b* are not in proximity to RUD1 330.

In this example, the RPV does not comply with the policy so that the IDP 310 does not permit the RUD1 330 to access the SPn 340. The IDP 310 communicates to the SPn 340 that the user is not in proximity to the RUD1 330 that is connected to the SPn 340. The SPn 340 sends, via a processor, a notification to the RUD1 330 and blocks further access of the SPn 340 by the RUD1 330 while both the user (e.g., based on the user's registered watch 330b*) and the RUMD 320* are not in proximity to the RUD1 330.

FIG. 4 is an illustration of continuous, sporadic, periodic and/or repeated collection of DPA RS 409 from the DPoT devices in the DPxAN, providing resources to the DDL (example of DPA table 408) for the PRPV. By using continuous, sporadic, periodic and/or repeated dynamic MFA different from some known MFA systems, the disclosed BMFA system may eliminate the need for the orthodox MFA credentials 407 of something you know (knowledge), while continuing to use something you have (possession) and something you are (biometric factor). In addition, the BMFA monitors and analyzes environmental factors and recognition signals (RS) from a DDL (e.g., DDL 208, DDL 308). The IDPAmd on a user's RUMDn 420 continuously, sporadically, periodically and/or repeatedly monitors the user's DPxAN, providing the IDP with entries for the DPA table 408. The DPA table 408 entries can include, for example, RS 409 that may include, but are not limited to, details such as the date and time of the event, the user device triggering the event and that device's identification parameters, whether the device is paired or not paired to the RUMDn 420 and whether the device is exchanging data with the RUMDn 420, the distance between the RUDn 430 and the RUMDn 420, and more.

The example DPA table 408 in the DPoT 408 in FIG. 4 illustrates a sequence of DPA events. The first event at 08:12 records an RUDn 430 in proximity to the RUMDn 420, the RUDn's 430, distance from RUMDn 420, that they are not paired to each other and there is no data exchange between them. The second event at 08:12 records a user registered watch 430b, its distance from the RUMDn 420, that it is paired to RUMDn 420 and is exchanging data with RUMDn 420. On receiving an authentication request for the user from the SPn (not shown in FIG. 4) originating at the RUDn 430, the IDP (not shown in FIG. 4) can return an authentication response based on RPV 411, and further a representation of a user risk meter 406 (which may be available as part of IDP analytics and may show, for example, a low-risk score for the user). The third event record at 09:37 shows that the same user registered watch 430b, previously recorded in the second event, has moved out of the DPxAN (not shown in FIG. 4) so that its distance from the RUMDn 420 is not measurable, and that the user registered watch 430b is no longer exchanging data with RUMDn 420. The third event can indicate that the registered watch 430b (assumed to be worn by the user 460) has moved away from the DPxAN of the RUMDn 420 and the RUDn 430; where the RUMDn 420 and the RUDn 430 are in proximity with each other. To ensure that the user 460 is not in proximity with the RUMDn 420, the IDP (not shown in FIG. 4) can issue a request to the user 460 via the RUDn 430 or the RUMDn 420 to provide an indication (e.g., enter his fingerprint, scan a face, provide a password, provide a token, etc.). If the indication is not entered, the IDP can notify the SPn with an updated RPV 411 indicating a higher-risk score on the risk-meter 406. If, for example, the higher-risk score is above a predetermined risk threshold score, a remedial action can be performed (e.g., preventing access to SPn).

FIG. 5 is a schematic diagram illustrating a BMFA login authentication flow 500, according to an embodiment. The login process may include but is not limited to one of: machine login process, browser-based login process, and/or native application login process.

Referring to FIG. 5, in step 1, the IDPAmd on an RUMDn 520 continuously, sporadically, periodically and/or repeatedly monitors the user's DPxAN (not shown in FIG. 5), determining that the RUMDn 520 and the RUDn 530 are in proximity, based on BT short-range communication between the RUMDn 520 and the RUDn 530. Step 1 can be supervised by the IDPAmd of the RUMD 520. For example, IDPAmd can cause signals to be sent from RUMDn 520 to RUDn 530 to ensure that RUMDn 520 is in proximity to RUDn 530. As another example, IDPAmd can analyze signals received at RUMDn 520 from RUDn 530 to ensure that RUMDn 520 is in proximity to RUDn 530.

In step 2, the IDPAmd on the user's RUMDn 520 provides the IDP 510 with the DPA which indicate whether the RUMDn 520 and the RUDn 530 are in proximity (e.g., within a predetermined distance), according to a predetermined policy. In some implementations, to reduce the load on the IDP 510, the predetermined policy can be defined to communicate necessary, desired, requested and/or predefined details to the IDP 510. The IDP 510 may prompt the user to provide a biometric indication (e.g., scan a fingerprint, scan a face, etc.) on the RUMDn 520, or on the RUDn 530 (if the RUDn's hardware and software support a biometric check). The IDPAmd can cause the RUMDn 520 to transmit an acknowledgment of the indication (e.g., fingerprint, face, etc.) to the IDP 510, thereby starting to form the ToT 503.

In step 3, the user requests passwordless access from RUDn 530 to services protected by SPn 540 or any other SPn such as SP2 543 or SP3 546.

In step 4, a redirect response (e.g., a single-sign-on (SSO) protocol) is sent from the SPn 540 to the IDP 510 via RUDn 530, which may include, for example, RUDn 530 Trusted Information (TI) such as but not limited to the hardware and software fingerprint of the device, the browser fingerprint, cryptographic signals, the BT MAC address of the RUD, and an IDP cookie which is gathered to uniquely identify the RUD, and this information can also provide a characterization of the user attempting to access to the SPn.

In step 5, the IDP 510 may receive information including but not limited to an IDP 510 cookie stored in the RUDn 530, the TI (e.g., the hardware and software fingerprint of the RUDn 530 device), the browser fingerprint, cryptographic signals, and/or the BT MAC address of the RUDn 530, which can be gathered to uniquely identify the RUDn 530 to provide a characterization of the user attempting to access to the SPn. The IDP 510 identifies whether the information received from RUDn 530 (e.g., its BT MAC address) is compatible (e.g., matches, is associated with, and/or the like) with the information received from the RUMDn 520 (e.g., the RUDn 530 BT component MAC address) which is bound (in proximity) with the RUDn 530.

According to the IDP 510 or SPn 540 policy, the IDP 510 determines, via a processor, whether the user is required to provide an indication (e.g., scan a fingerprint, face scan, etc.), or whether the IDP 510 can issue an authentication acknowledgment and/or RPV without additional information. The authentication acknowledgement and/or RPV can then be redirected to the SPn 540.

In step 6, SPn 540 grants access to RUDn 530.

In step 7, SPn 540 optionally submits a notification to IDP 510 with data including the SPn 540 ID, the SPn UIDidp (which may be different from the SPn internal user ID for security and privacy), and that the user is logged in from their RUDn 530, establishing the ToA 504.

In some implementations, FIG. 5 provides for extending the login authentication flow ToP 505 with traditional MFA for purposes including silent authentication, fallback in the event of redirect failure, and anti-copycat attacks.

After the ToT 503 is established, the IDP 510 can issue a request to the NS 550 to send a notification to the IDPAmd on the user's RUMDn 520. The RUMDn 520 connects to the IDP 510 which prompts the user for an indication (e.g., a biometric action such as a fingerprint scan, entering a password, providing a token, etc.). Based on the user's indication (e.g., biometric action), the IDP 510 authenticates the user and notifies the SPn 540 that the authentication RPV includes the establishment of the Triangle of Push (ToP) 505.

FIG. 6 is a sequence diagram illustrating a zero and/or reduced login and reduced risk authentication flow according to the ToT 603 and ToA 604. Referring to FIG. 6, in step 1, the IDPAmd on a registered user's RUMDn 620 continuously, sporadically, periodically and/or repeatedly monitors the user's DPxAN, determining that the RUMDn 620 and the RUDn 630 are in proximity, based on BT short-range communication between the RUMDn 620 and the RUDn 630 and supervised by the IDPAmd of the RUMDn 620.

In step 2, the IDPAmd on the user's RUMDn 620 generates DPA; in step 2a, the IDPAmd on the user's RUMDn 620 provides the IDPn 610 (which includes or can access the DDL 608) with DPA indicating that the user 660, the RUMDn 620 and the RUDn 630 are all in proximity, completing the ToPx. The IDP 610 may, according to a predetermined policy, prompt the user for an indication (e.g., a biometric action such as a fingerprint or face scan, a password, a token, etc.) on the RUMDn 620. The IDPAmd, according to the predetermined policy, causes the RUMDn 620 to transmit an acknowledgment of the user's indication (e.g., biometric action, cryptographic action, location signals, etc.) to the IDP 610, thereby starting to form the ToT 603.

In step 3, the user 660, who is in proximity to the RUDn 630 and RUMDn 620, requests passwordless access from RUDn 630 to services protected and/or provided by SPn 640.

In step 4, a redirect response from SPn 640 to the IDP 610 towards the RUDn 630 may forward trusted information (e.g., device context) of the RUDn 630 by an SSO protocol to the IDP 610. The IDP 610 may receive a cookie stored in the RUDn 630, the TI (e.g., the hardware and software fingerprint of the device, the browser fingerprint, cryptographic signals, and the BT MAC address of the RUDn 630 that is gathered to uniquely identify the RUDn 630, and/or the like) to provide a characterization of the user attempting to access to the SPn. The IDP 610 identifies that the information received from RUDn 630 (e.g., its BT MAC address) is compatible with the information received (e.g., the RUDn 630 BT component MAC address) from the RUMDn 620, which is in proximity with the RUDn 630.

In step 5, according to the IDP 610 or SPn 640 policy, the IDP 610 determines whether to request that the user provide a further indication (e.g., a biometric indication such as a fingerprint or face scan, etc.), or to issue an authentication acknowledgment (Login Approved Certificate) and/or RPV to the SPn 640 without requesting additional information. If a further indication (e.g., biometrics check) is requested, a request can be presented on the user's RUDn 630 screen; if the request is a biometric check and the RUDn 630 is equipped with a biometric sensor (e.g., hardware, software), the user can use the RUDn 630 device to perform the biometrics check; additionally or alternatively, the user is required to respond to a push notification from the IDP 610 (e.g., which opens the IDPAmd on the RUMDn 620 automatically), and/or to open the IDPAmd on the RUMDn 620 manually to provide the biometric check (or other indication) through the IDPAmd.

In step 6, SPn 640 grants access to RUDn 630.

In step 7, SPn 640 optionally submits a notification to IDP 610 with data that includes the SPn 640 ID, the SPn/UIDidp, and confirmation that the user is logged in, completing the establishment of the ToA 604.

FIG. 7 is a sequence diagram illustrating zero and/or reduced trust and zero and/or reduced friction in an authentication flow according to the Trusted Loop Challenge (TLC) 704.

Referring to FIG. 7, in step 0 the IDPAmd on a RUMDn 720 supervises and continuously, sporadically, periodically and/or repeatedly monitors the user's DPxAN (e.g., IDPAmd can cause signals to be sent from RUMDn 720 to RUDn 730 to check if RUMDn 720 is in proximity to RUDn 730; IDPAmd can analyze signals received at RUMDn 720 from RUDn 730 to check if RUMDn 720 is in proximity to RUDn 730), determining that the RUMDn 720 and the RUDn 730 are in proximity, based on BT short-range communication between the RUMDn 720 and the RUDn 730. The IDPAmd on the user's RUMDn 720 provides according to a predetermined policy (not shown on FIG. 7) the IDP 710 with Risk Signals (RS) such as DPA indicating that the RUMDn 720 and the RUDn 730 are in proximity. The IDP 710 may prompt the user to provide a biometric indication (e.g., a fingerprint or face scan, etc.) and/or other indication (e.g., password, token, etc.) on the RUMDn 720. The IDPAmd causes the RUMDn 720 to transmit an acknowledgment of the indication (e.g., the fingerprint or face scan, etc.) to the IDP 710, thereby starting to form the ToT, (not shown on FIG. 7).

In step 1, the user 760 that is in proximity to RUDn 730 and RUMDn 720 requests passwordless access from RUDn 730 to services protected by SPn 740.

In step 2, a redirect response is sent from SPn 740 to the IDP 710 towards the RUDn 730 that can forward the RUDn 730 TI to the IDP 710 using, for example, an SSO protocol. The IDP 710 can receive TI from the RUDn 730 device such as, but not limited to, an IDP cookie that was previously stored on the RUDn 730 (e.g., during enrollment), a hardware and software fingerprint of the device, a browser fingerprint, cryptographic signals, a BT MAC address, etc. The TI is gathered to uniquely identify the RUDn 730 and to provide a characterization of the user attempting to access to the SPn 740. The IDP 710 identifies that the BT MAC address of RUDn 730 received from RUDn 730 matches the RUDn 730 BT MAC address received from the RUMDn 720, and that RUMDn 720 is in proximity with the RUDn 730.

In step 3, the IDP 710 may prompt the user for a Trusted Loop Challenge (TLC) 704, in accordance with the policy.

In further reference to step 3, the IDP 710 creates and/or defines, via a processor, a QR code (QRC) 701 with information (e.g., a challenge) encrypted with a public key of the RUMDn 720 that can be decrypted by a private key of the RUMDn 720 (and not by other devices not having the private key, such as RUDn 730) and sends the QRC to the RUDn 730. RUDn 730 can display the QRC, which can be scanned by user 760 using RUMDn 720 during a TLC to indicate that the user 760, RUDn 730, and RUMDn 720 are in close proximity, confirming the ToPx and further strengthening the ToT.

In further reference to step 3, the user 760 can take a picture of the displayed QRC using the RUMDn 720 camera 702.

In step 4, the IDPAmd on the RUMDn 720 opens, via a processor, the QRC 701 and decrypts the encrypted challenge encoded by the QRC with its Private Key.

In step 5, the decrypted challenge is sent by the IDPAmd of RUMDn 720 to the IDP 710, thus completing the TLC 704.

In step 6, the IDP 710 compares, via a processor, the decrypted challenge it received from the IDPAmd of RUMDn 720, with the original challenge generated by the IDP 710 for the TLC 704 and confirms that they match.

In step 7, the IDP 710, having confirmed that the decrypted challenge it received from the IDPAmd of RUMDn 720 matches the original challenge generated by the IDP 710 for the TLC 704 and was received within a time permitted by the policy, confirms that the security of the ToT is sufficiently reliable to allow safe access requests by the user 760.

In further reference to step 7, the SPn 740 receives an authentication approval from the IDP 710, which may include the RPV.

In step 8, SPn 740 grants access to user 760 via their RUD 730.

In step 9, SPn 740 optionally submits a notification to IDP 710 that the user is logged-in; the notification includes data such as but not limited to the SPn 640 ID, and the SPn/UIDidp and, completes the establishment of the TLC 704.

FIG. 8 is a sequence diagram illustrating a zero and/or reduced inaccessibility authentication flow when the IDP server 810 is inaccessible.

In further reference to FIG. 8, in step 0, during its regular operation (e.g., when not authenticating and/or prior to an authentication) the IDP 810 delivers one or more specific tokens (InaccToks) to the RUMD 820 and to the SP 840; the IDPAmd on the RUMD 820, and SPn 840 securely stores the InaccToks; the InaccToks can be used for strong passwordless user authentication to allow the user to log in to SPn 840 when IDP 810 is inaccessible.

Additionally in step 0, the IDPAmd on a registered user's RUMDn 820 supervises and continuously, sporadically, periodically and/or repeatedly monitors the user's DPxAN to determine that the RUMDn 820, the RUDn 830, and the user 860 are in proximity, based on BT short-range communication between the RUMDn 820 and the RUDn 830. In some instances, during supervising and/or monitoring, the IDPAmd can cause signals to be sent from RUMDn 820 to RUDn 830 to check if RUMDn 820 is in proximity to RUDn 830. As another example, IDPAmd can analyze signals received at RUMDn 820 from RUDn 830 to check if RUMDn 820 is in proximity to RUDn 830

In step 1, the user requests passwordless access from RUDn 830 to services protected by SPn 840.

In steps 2, a signal is sent from SPn 840 to IDP 810 inquiring if RUDn 830 can access the services protected by SPn 840.

In step 3, the SPn 840 detects that the IDP 810 is inaccessible (e.g., SPn 840 does not receive a response to its inquiry in step 2 from IDP 810 within a predetermined time period).

In step 4, SPn 840 requests, via a processor and from the RUDn 830, the InaccTok issued by the IDP 810 to the RUMDn 820 in step 0.

In step 5, an InaccTok login request is displayed on the RUDn 830 requesting that the user starts the process of obtaining the InaccTok from RUMDn 820 to send to the SPn 840.

In step 6, the user begins the process of collecting RS used to calculate the RPV that is used to determine whether the user can receive the InaccTok from the IDPAmd on RUMDn 820. In some implementations, each RS is associated with (e.g., assigned) a weight which can be changed or controlled, where the RS, together with the weights assigned to the RS (e.g., total weight) are used to calculate the RPV. In response to the user beginning the process, the IDPAmd calculates the RPV using RS that may include but are not limited to a proximity and liveness check, an acknowledgment between the user the RUMD and the RUD, a biometrics acknowledgment, cryptographic signals, and the RUMD location signals (such as global positioning system (GPS) location or cellular network location-based data). If the RPV meets the predetermined policy, the user may also be prompted to perform a biometric check (e.g., fingerprint or face biometrics).

In step 7, a code uniquely associated with the InaccTok is exposed and/or presented to the user 860 on the RUMDn 820 (and not on other devices) and the user is able to view and/or copy (e.g., write down, memorize, copy to clipboard, etc.) and/or provide the InaccTok to RUDn 830 if the RPV calculated by RUMDn 820 in step 6 meets the predetermined policy (and is otherwise not able to provide the InaccTok to RUDn 830).

In step 8, user 860 enters the InaccTok code on the RUDn 830.

In step 9, RUDn 830 sends, via a processor, the InaccTok code to the SPn 840 for strong user authentication.

In steps 10 and 11, the SPn 840 confirms that the user's InaccTok code received from the RUDn 830 matches the user InaccTok code received by the SPn 840 that both of them received from the IDP 810 at step 0 before the inaccessibility event occurred (in order to provide the SPn 840 with the ability to provide strong authentication of the user requesting the passwordless login during such an inaccessibility event). After confirming the InaccToks match, the SPn 840 can complete a zero and/or reduced inaccessibility user authentication flow and provide user 860 access from RUDn 830 to SPn 840 services while IDP 810 is inaccessible.

FIG. 9 is a schematic diagram of an embodiment illustrating BMFA login from the RUMDn 920 to the SPn 940.

In further reference to FIG. 9, the IDPAmd on the RUMDn 920 supervises and continuously, sporadically, periodically and/or repeatedly monitors the user's DPxAN 901 for RS (e.g., IDPAmd can cause signals to be sent from RUMDn 920 to RUDn 930b to check if RUMDn 920 is in proximity to RUDn 930b. As another example, IDPAmd can analyze signals received at RUMDn 920 from RUDn 630 to check if RUMDn 920 is in proximity to RUDn 930b), determining that the RUMDn 920, the user (not shown in FIG. 9), and the user's registered BT-enabled watch RUDn 930b are in proximity, based on BT short-range communication between the RUMDn 920 and the watch RUDn 930b. It should be understood that any of the registered user devices in the DPxAN 901 (e.g., RUDn) can play the role of RUDn 930b.

In step 0, according to the relevant predetermined policy (that will vary according to the needs of the specific organization), the IDPAmd on the user's RUMDn 920 provides the IDP 910 with the trusted information (TI) of the RUMDn 920, such as but not limited to a proximity check determining whether the user (not shown in FIG. 9), the RUMDn 920 and the watch RUDn 930b are in a predetermined proximity with each other, the biometric verification indication collected from the RUMD 920, cryptographic signals, and the RUMD 920 location (e.g., GPS, cellular, and/or the like).

In step 1, the user (not shown in FIG. 9) who is in proximity to the watch RUDn 930b and RUMDn 920 opens the SPn application (e.g., native application, browser application, etc.) on the RUMDn 920, to request access to SPn 940.

In step 2, the SPn 940 redirects a single sign-on (SSO) protocol request to the IDP 910, causing the trusted information (TI) of the RUMDn 920 to be sent to SPn 940.

In step 3, the IDP 910 receives a request via the SSO protocol to authenticate the user, based on the TI received from RUMDn 920.

Furthermore, in step 3, the IDP 910 can confirm that the TI received from the RUMDn 920 match the TI received from the IDPAmd of the RUMDn 920 at step 0. Leveraging the DDL 908 and according to the relevant predetermined policy, the IDP 910 may request an indication (e.g., a biometric action such as a fingerprint or face scan) on the RUMDn 920 to ensure calculation of the lowest possible RPV and further reduce user friction. In some implementations, the RPV meets a predefined criterion (e.g., is less than a threshold) when access to a service of the SPn 940 is granted.

In step 4, the IDP 910 issues a redirect using the SSO protocol, which includes an approval or denial of access to the services provided by SPn 940 and may also include an RPV.

In step 5, SPn 940 grants or rejects access to the user of RUMDn 920.

In step 6, SPn 940 can notify the IDP 910 that the user SPn/UIDidp is logged in.

FIG. 10 shows a flowchart of a method 1000 to authenticate a user based on short-range communication between a RUMD associated with the user and a RUD associated with the user, according to an embodiment. In some implementations, method 1000 can be performed by a processor (e.g., the processor of IDP 210, IDP 310, IDP 510, IDP 610, IDP 710, IDP 910, and/or the like).

At 1001, a set of dynamic proximity attribute (DPA) Risk Signals (RS) are received from a registered user mobile device (RUMD) (e.g., RUMDn 220, RUMD1 320, RUMDn 330d, RUMD 320*, RUMDn 420, RUMDn 520, RUMDn 620, RUMDn 720, RUMDn 820n, RUMDn 920, and/or the like) communicably coupled to the IDP indicating whether a user is within a predetermined proximity of the RUMD and a registered user device (RUD) (e.g., RUDn 230, RUDn 330a, RUD1 330, RUD2 330b, RUD3 330c, RUDn 430, RUDn 530, RUDn 630, RUDn 730, RUDn 830, RUDn 930b, and/or the like) based on short-range communication between the RUMD and the RUD. The RUMD is configured to monitor devices in short-range communication in a dynamic proximity area network (DPxAN) via an IDP application (IDPAmd) associated with the RUMD. In some implementations, the IDP is communicably coupled with the RUD. In some implementations, the IDP determines trust information (TI) associated with the RUD.

At 1002, determine a Risk Parameter Value (RPV) according to the DPA RS received from the RUMD.

At 1003, a request to authenticate the user at the RUD on which a user access request originated is received from a Service Provider (SPn) (e.g., SPn 240, SPn 340, SP2 543, SP3 546, SPn 540, SPn 640, SPn 740, SPn 840, SPn 940, and/or the like).

At 1004, an authentication response is sent to the SPn based on the RPV.

Some implementations of method 1000 further include determining, according to the DPA, a proximity distance between the RUMD and the RUD.

Some implementations of method 1000 further include determining, according to the DPA, whether the RUMD and the RUD are paired. Some implementations further include determining, in response to determining that the RUMD and the RUD are paired, that a direct communication channel is open between the RUMD and the RUD that facilitates data exchange.

Some implementations of method 1000 further include establishing a Triangle of Trust (ToT) loop between the IDP, the RUD, and the RUMD. Some implementations of method 1000 further include sending a signal representing a challenge to increase the level of security of the TOT loop.

Some implementations of method 1000 further include receiving, from the IDPAmd, a representation of at least one of Fast Identification Online (FIDO) biometric data associated with the user or enclaved microcontroller biometric verification associated with the user.

In some implementations of method 1000, the DPA received from the IDPAmd further includes an RS collected from the devices in short-range communication in the DPxAN and in a predetermined proximity of the RUMD. In some implementations, the set of DPA RS is filtered and packeted by the IDPAmd according to a predetermined policy prior to being received by the IDP. In some implementations, the set of DPA RS can include at least one of a representation of DPA, a biometric signal, a cryptographic signal, or location information signal. In some implementations, the set of RS can be received by the IDP according to policy parameters.

Some implementations of method 1000 further include receiving, via the IDPAmd, a representation of a location of the RUMD. In some implementations, the location is represented by at least one of Global Positioning System (GPS) data or cellular network location-based data. Some implementations further include storing the set of RS collected from the DPoT devices in a Dynamic Data Lake (DDL). In some implementations, the set of RS includes a plurality of RS. In some implementations, the plurality of RS includes a biometric verification indication collected from the RUMD, cryptographic signals (e.g., Passkey), and location data of the RUMD. Some implementations further include providing, using an artificial intelligence (AI) model, analytics based on contextual data stored in the DDL and behavioral data stored in the DDL to generate the RPV for the authentication response. In some implementations, the RPV enables the IDP to allow the user passwordless access to a service associated with the SPn based on cryptographic signals (e.g., Passkey), and repeated online dynamic RS including at least one of proximity between the user, the RUMD and the RUD, a location of the user, the contextual data, the behavioral data, or device trust information (TI) associated with the IDP.

In some implementations of method 1000, the user access request is part of a login process. In some implementations, the login process is a machine login process. In some implementations, the login process is a browser-based login process. In some implementations, the login process is a native application login process.

In some implementations of method 1000, the RPV calculated for the user in a Triangle of Proximity (ToPx) serves multiple SPns requesting to authenticate a user with the RUD or the RUMD.

In some implementations of method 1000, the RPV is calculated for the RUMD. Some implementations further include receiving a SPn request. Some implementations further include reusing the RPV to provide authentication for the SPn request.

FIG. 11 shows a flowchart of a method 1100 to cause passwordless authentication of a user in an inaccessibility situation, according to an embodiment. In some implementations, method 1100 can be performed by a processor (e.g., processor of IDP 210, 310, 510, 610, 710, 910, and/or the like).

At 1101, a representation of dynamic proximity attributes (DPA) indicating whether a user is within a predetermined proximity of a registered user mobile device (RUMD) (e.g., RUMDn 220, RUMD1 320, RUMDn 330*d*, RUMD 320*\, RUMDn 420, RUMDn 520, RUMDn 620, RUMDn 720, RUMDn 820***n*, RUMDn 920, and/or the like) and a registered user device (RUD) (e.g., RUDn 230, RUDn 330*a*, RUD1 330, RUD2 330*b*, RUD3 330*c*, RUDn 430, RUDn 530, RUDn 630, RUDn 730, RUDn 830, RUDn 930*b*, and/or the like) is received at an identity provider (IDP) (e.g., IDP 210, IDP 310, IDP 510, IDP 610, IDP 710, IDP 910, and/or the like) and from the RUMD communicably coupled to the IDP based on short-range communication between the RUMD and the RUD. The RUMD is configured to monitor devices in short-range communication in a dynamic proximity area network (DPxAN) via an IDP application (IDPAmd).

At 1102, the IDP sends each service provider (e.g., SPn 240, SPn 340, SP2 543, SP3 546, SPn 540, SPn 640, SPn 740, SPn 840, SPn 940, and/or the like) a InaccTok that is unique to the SP and the RUMD (e.g., InaccTok SP1-RUMD1) and sends a corresponding InaccTok for that SP to the RUMD (e.g. InaccTok SP1-RUMD1) to be stored on the RUMD IDPAmd. The RUMD is configured to (1) store the corresponding unique InaccToks for all of the SPs that the RUMD want to be able to access on the RUMD IDPAmd, in response to receiving the corresponding InaccTok and (2) send the unique InaccTok relevant to a specific SP (e.g. InaccTok SP1-RUMD1) to the relevant SP (e.g. SP1) to facilitate passwordless authentication and allow the user to log in to the specific SPn with the corresponding unique InaccToken during an inaccessibility event of the IDP.

In some implementations of method 1100, before releasing the InaccToken from the IDPAmd on the RUMD so it can be sent to the SP, the user is prompted to perform a biometrics check to open the IDPAmd on the RUMD. The IDPAmd calculates a Risk Parameter Value (RPV) based on the set of RS that includes a representation of at least one of a proximity and liveness check, BT acknowledgment between the user, the RUMD, the RUD, a biometric acknowledgment, and location, and checks that the RPV satisfies a predefined policy.

FIG. 12 shows a flowchart of a method 1200 to access a service provider based on short-range communications between a RUMD and a RUD, according to an embodiment. In some implementations, method 1200 can be performed by a processor (e.g., processor of RUMDn 220, RUMD1 320, RUMDn 330d, RUMD 320*, RUMDn 420, RUMDn 520, RUMDn 620, RUMDn 720, RUMDn 820n, RUMDn 920, and/or the like).

At 1201, the method 1200 includes monitoring at least one device that is in short-range communication in a dynamic proximity area network (DPxAN).

At 1202, the method 1200 includes providing an identity provider (IDP) (e.g., IDP 210, IDP 310, IDP 510, IDP 610, IDP 710, IDP 910, and/or the like) with risk parameters (RP) including a representation of dynamic proximity attributes (DPA) that determine whether a user is in a predetermined proximity with the RUMD and a registered user device (RUD) (e.g., RUDn 230, RUDn 330a, RUD1 330, RUD2 330b, RUD3 330c, RUDn 430, RUDn 530, RUDn 630, RUDn 730, RUDn 830, RUDn 930b, and/or the like) based on short-range communication between the RUMD and the RUD, the biometrics acknowledgment, cryptographic signals (e.g., Passkey), and location data. The RUMD can be in communication with the IDP and a plurality of service providers (e.g., SPn 240, SPn 340, SP2 543, SP3 546, SPn 540, SPn 640, SPn 740, SPn 840, SPn 940, and/or the like).

At 1203, the method 1200 includes attempting to access a service provider from the plurality of service providers.

At 1204, the method 1200 includes sending a login request to the service provider.

At 1205, the method 1200 includes sending Trust Information (TI) to the IDP that uniquely identifies the RUMD device.

At 1206, the method 1200 includes receiving an indication of an access grant from the service provider confirming that the user is within a predetermined acceptable proximity to at least one RUD that is also in the same DPxAN as the RUMD.

In some implementations of method 1200, the RUD is one of multiple RUDs in the DPxAN monitored by an IDP Application (IDPAmd) of the RUMD. In some implementations, the multiple RUDs include at least one of a watch associated with the user, a laptop associated with the user, or an additional RUMD associated with the user.

In an embodiment, a set of signals (e.g., dynamic proximity attributes risk signals) indicating whether a user is within a predetermined proximity of a first compute device (e.g., RUMD) and a third compute device (e.g., RUD) is received from the first compute device and at a second compute device (e.g., IDP). The first compute device can be configured to monitor devices in communication with the first compute device (e.g., in short-range communication). A risk value (e.g., proximity risk parameter value and/or risk parameter value) is determined based on the set of signals at the second compute device. A request to authenticate the user at the third compute device is received from a fourth compute device (e.g., SPn) and by the second compute device. An authentication response is sent to the fourth compute device by the second compute device, based on the risk value.

In an embodiment, a set of signals indicating whether a user is within a predetermined proximity of a first compute device (e.g., RUMD) and a third compute device (e.g., RUD) is received from the first compute device and at a second compute device (e.g., IDP). The first compute device is configured to monitor deices in short-range communication with the first compute device. A first token is sent, by the second compute device, to a fourth compute device (e.g., SPn) and a second token equivalent to the first token is sent to the first compute device. The first compute device is seeking to receive and/or access a service associated with (e.g., hosted by) the fourth compute device. The first compute device is caused to send the second token to the fourth compute device. If the fourth compute device determines that the first token and the second token are equivalent, the first compute device can access the service (e.g., during inaccessibility of the second compute device). If the fourth compute device determines that the first token and the second token are not equivalent, the first compute device cannot access and/or is denied access to the service (e.g., during inaccessibility of the second compute device).

In an embodiment, a first compute device (e.g., RUMD) that is in short-range communication with a third compute device (e.g., RUD) is monitored by an IDPAmd on the first compute device. At least one risk value indicating whether a user is in a predetermined proximity to the first compute device (e.g., RUMD) and a third compute device (e.g., RUD) is provided to a second compute device (e.g., IDP) by the first compute device (e.g., RUMD), based on short-range communication, such as BT between the first-compute device (e.g. RUMD) and the third compute device (e.g., RUD), biometrics received from the user by the first compute device (e.g., RUMD) or third compute device (e.g., RUD), cryptographic signal (e.g. Passkey), location data, and/or the like). A first signal is sent by the third compute device (e.g. RUD) to a fourth compute device (e.g., SPn) requesting access to a service associated with (e.g., hosted by) the fourth compute device (e.g., SPn). A second signal is sent by the third compute device (e.g., RUD) to the second compute device (e.g. IDP) that identifies the third compute device (e.g., RUD). A third signal is received by the second compute device (e.g., IDP) from the fourth compute device (e.g., SPn) indicating that the access to the service is granted and the user is within a predetermined proximity to at least one of the third compute device (e.g., RUD) and the first compute device (e.g., RUMD).

In some implementations, the SPn 240, RUDn 230, DPoT devices (such as watch 230b), RUMDn 220, IDP 210, and/or NS 250 shown and described with respect to FIG. 2; the SPn 340, RUDn 330a, CDn 370a, RUD1 330, Dn 370b, RUMD1 320, RUMDn 330d, Dn 370c, RUD2 330b, IDP 310, and/or RUD3 330c shown and described with respect to FIGS. 3A, 3B1, 3B2 and 3C; the RUDn 430, user registered watch 430b and/or RUMDn 420 shown and described with respect to FIG. 4; the SPn 540, RUDn 530, IDP 510, RUMDn 520, and/or NS 550 shown and described with respect to FIG. 5; the RUMDn 620, RUDn 630, SPn 640, IDP 610, and/or NS 650 shown and described with respect to FIG. 6; the RUMDn 720, RUDn 730, SPn 740, IDP 710, and/or NS 750 shown and described with respect to FIG. 7; the RUMDn 820, RUDn 830, SPn 840, IDP 810, and/or NS 850 shown and described with respect to FIG. 8; and/or the RUMDn 920, RUDn 930, SPn 940, IDP 910, and/or NS 950 shown and described with respect to FIG. 9 can be, for example, any type of computer, server, mobile device, smart watch, internet-of-things device, etc. that has a processor that executes instructions (e.g., software instructions stored in a memory). Although not shown in FIGS. 2-9, the various devices described herein (including the SPn 240, RUDn 230, DPoT devices (such as watch 230b), RUMDn 220, IDP 210, and/or NS 250 of FIG. 2; the SPn 340, RUDn 330a, CDn 370a, RUD1 330, Dn 370b, RUMD1 320, RUMDn 330d, Dn 370c, RUD2 330b, IDP 310, and/or RUD3 330c of FIGS. 3A, 3B1, 3B2 and 3C; the RUDn 430, user registered watch 430b and/or RUMDn 420 of FIG. 4; the SPn 540, RUDn 530, IDP 510, RUMDn 520, and/or NS 550 of FIG. 5; the RUMDn 620, RUDn 630, SPn 640, IDP 610, and/or NS 650 of FIG. 6; the RUMDn 720, RUDn 730, SPn 740, IDP 710, and/or NS 750 of FIG. 7; the RUMDn 820, RUDn 830, SPn 840, IDP 810, and/or NS 850 of FIG. 8; and the RUMDn 920, RUDn 930, SPn 940, IDP 910, and/or NS 950 of FIG. 9) can each include a processor and memory operatively coupled to the processor. The processor for each device can be configured to perform the methods, processes, and/or techniques discussed herein for that respective device (e.g., method 1000, 1100, 1200, etc.). Each of the processors can be, for example, a hardware based integrated circuit (IC), or any other suitable processing device configured to run or execute a set of instructions or a set of codes. For example, each of the processors can include a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC), a graphics processing unit (GPU), a neural network processor (NNP), and/or the like. Each of the processors can be operatively coupled to one or more respective memories through a system bus (for example, address bus, data bus, and/or control bus). The memories can store electronic information (e.g., executable code and/or instructions to cause the respective processor to perform methods, functions and/or processes described herein). Moreover, DDL 208 of FIG. 2; DDL 308 of FIGS. 3A, 3B1, 3B2 and 3C; DDL 508 of FIG. 5; DDL 608 of FIG. 6; DDL 708 of FIG. 7; DDL 808 of FIG. 8; and/or DDL 908 of FIG. 9, can each be any memory, database, data mine, data store, and/or the like. The term memory may refer to various types of processor-readable media such as, for example, random access memory (RAM), read-only memory (ROM), non-volatile random-access memory (NVRAM), programmable read-only memory (PROM), erasable programmable read only memory (EPROM), electrically erasable PROM (EEPROM), flash memory, magnetic or optical data storage, registers, etc.

Combinations of the foregoing concepts and additional concepts discussed here (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The skilled artisan will understand that the drawings primarily are for illustrative purposes and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

To address various issues and advance the art, the entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. As such, all examples and/or embodiments are deemed to be non-limiting throughout this disclosure.

It is to be understood that the logical and/or topological structure of any combination of any program components (a component collection), other components and/or any present feature sets as described in the Figures and/or throughout are not limited to a fixed operating order and/or arrangement, but rather, any disclosed order is an example and all equivalents, regardless of order, are contemplated by the disclosure.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a processor, a field programmable gate array (FPGA), and/or an application specific integrated circuit (ASIC). Software modules (executed on hardware) can include instructions stored in a memory that is operably coupled to a processor, and can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

While specific embodiments of the present disclosure have been outlined above, many alternatives, modifications, and variations will be apparent to those skilled in the art. Accordingly, the embodiments set forth herein are intended to be illustrative, not limiting.

The invention claimed is:

1. An identity provider (IDP) apparatus, comprising:
   a memory; and
   a processor operatively coupled to the memory, the processor configured to:
   receive, from a registered user mobile device (RUMD) communicably coupled to the IDP apparatus, a set of dynamic proximity attribute (DPA) Risk Signals (RS) indicating whether a user is within a predetermined proximity of the RUMD and a registered user device (RUD) based on short-range communication between the RUMD and the RUD, the RUMD configured to monitor devices in short-range communication in a dynamic proximity area network (DPxAN) via an IDP application (IDPAmd) associated with the RUMD;
   establish a Triangle of Trust (ToT) loop between the IDP apparatus, the RUD, and the RUMD;
   send a signal representing a challenge to increase a level of security of the ToT loop;
   determine a Risk Parameter Value (RPV) according to the set of DPA RS received from the RUMD;
   receive, from a Service Provider (SPn), a request to authenticate the user at the RUD on which a user access request originated; and
   send an authentication response to the SPn based on the RPV.

2. The IDP apparatus of claim 1, wherein the IDP apparatus is communicably coupled with the RUD.

3. The IDP apparatus of claim 2, wherein the processor is further configured to determine Trust Information (TI) associated with the RUD.

4. The IDP apparatus of claim 1, wherein the processor is further configured to determine, according to the DPA, a proximity distance between the RUMD and the RUD.

5. The IDP apparatus of claim 1, wherein the processor is further configured to determine, according to the DPA, whether the RUMD and the RUD are paired.

6. The IDP apparatus of claim 5, wherein the processor is further configured to determine, in response to determining that the RUMD and the RUD are paired, that a direct communication channel is open between the RUMD and the RUD that facilitates data exchange.

7. The IDP apparatus of claim 1, wherein the processor is further configured to:

receive, from the IDPAmd, a representation of at least one of Fast Identification Online (FIDO) biometric data associated with the user or enclaved microcontroller biometric verification associated with the user.

8. The IDP apparatus of claim 1, wherein the DPA received from the IDPAmd further includes an RS collected from the devices in short-range communication in the DPxAN and in a predetermined proximity of the RUMD.

9. The IDP apparatus of claim 1, wherein the processor is further configured to:
receive, via the IDPAmd, a representation of a location of the RUMD.

10. The IDP apparatus of claim 8, wherein the set of DPA RS and the RS is filtered and packeted by the IDPAmd according to a predetermined policy prior to being received by the IDP apparatus, the RS including at least one of a representation of DPA, a biometric signal, a cryptographic signal, or location information, the set of DPA RS received by the IDP apparatus according to policy parameters.

11. The IDP apparatus of claim 9, wherein the location is represented by at least one of Global Positioning System (GPS) data or cellular network location-based data.

12. The IDP apparatus of claim 8, wherein the processor is further configured to:
store the set of DPA RS collected from dynamic proximity of things (DPoT) devices in a Dynamic Data Lake (DDL), the set of DPA RS including a biometric verification indication collected from the RUMD and location data of the RUMD.

13. The IDP apparatus of claim 12, wherein the processor is further configured to:
provide, using an artificial intelligence (AI) model, analytics based on contextual data stored in the DDL and behavioral data stored in the DDL to generate the RPV for the authentication response.

14. The IDP apparatus of claim 13, wherein the RPV enables the IDP apparatus to allow the user passwordless access to a service associated with the SPn, based on repeated online dynamic RS including at least one of proximity between the user, the RUMD and the RUD, a location of the user, the contextual data, the behavioral data, or device trust information (TI) associated with the IDP apparatus.

15. The IDP apparatus of claim 1, wherein the user access request is part of a login process.

16. The IDP apparatus of claim 15, wherein the login process is a machine login process.

17. The IDP apparatus of claim 15, wherein the login process is a browser-based login process.

18. The IDP apparatus of claim 15, wherein the login process is a native application login process.

19. The IDP apparatus of claim 1, wherein the RPV calculated for the user in a Triangle of Proximity (ToPx) serves multiple SPns requesting to authenticate a user with the RUD or the RUMD.

20. The IDP apparatus of claim 1, wherein the RPV is calculated for the RUMD, and the processor is further configured to:
receive a SPn request; and
reuse the RPV to provide authentication for the SPn request.

21. An identity provider (IDP) apparatus, comprising:
a memory; and
a processor operatively coupled to the memory, the processor configured to:
receive, from a registered user mobile device (RUMD) communicably coupled to the IDP apparatus, a representation of dynamic proximity attributes (DPA) indicating whether a user is within a predetermined proximity of the RUMD and a registered user device (RUD) based on short-range communication between the RUMD and the RUD, the RUMD configured to monitor devices in short-range communication in a dynamic proximity area network (DPxAN) via an IDP application (IDPAmd);
establish a Triangle of Trust (ToT) loop between the IDP apparatus, the RUD, and the RUMD;
send a signal representing a challenge to increase a level of security of the ToT loop; and
send at least one unique inaccessibility token (InaccTok) to each service provider from a set of service providers and a corresponding InaccTok to the RUMD, the RUMD configured to (1) store the corresponding InaccTok in response to receiving the corresponding InaccTok and (2) send the
corresponding InaccTok to the set of service providers to facilitate passwordless authentication and allow the user to log in to the set of service providers during an inaccessibility event of the IDP apparatus.

22. The IDP apparatus of claim 21, wherein:
the sending of the InaccTok further includes sending a set of risk signals (RS) collected by the IDPAmd;
the IDPAmd is configured to calculate a Risk Parameter Value (RPV), based on the set of RS, that includes a representation of at least one of a proximity and liveness check, Bluetooth acknowledgment between the user, the RUMD, the RUD, a biometric acknowledgment, or a location; and
the InaccTok is configured to be transferred to the set of service providers for user authentication if the RPV satisfies a predefined policy.

23. A registered user mobile device (RUMD) apparatus, comprising:
a memory; and
a processor operatively coupled to the memory, the processor configured to:
monitor at least one device that is in short-range communication in a dynamic proximity area network (DPxAN);
provide an identity provider (IDP) with risk parameters (RP) including a representation of dynamic proximity attributes (DPA) that determine whether a user is in a predetermined proximity with the RUMD apparatus and a registered user device (RUD) based on short-range communication between the RUMD apparatus and the RUD, a biometrics acknowledgment, and location data to establish a Triangle of Trust (ToT) between the IDP, the RUMD apparatus, and the RUD, the RUMD apparatus in communication with the IDP and a plurality of service providers;
send a signal responding to a challenge from the IDP to confirm a security of the ToT;
attempt to access a service provider from the plurality of service providers;
send a login request to the service provider;
send Trust Information (TI) to the IDP that uniquely identifies the RUMD apparatus; and
receive an indication of an access grant from the service provider confirming that the user that is within a predetermined acceptable proximity to at least one RUD that is also in a same DPxAN as the RUMD apparatus.

24. The RUMD apparatus of claim 23, wherein the RUD is one of multiple RUDs in the DPxAN monitored by an IDP Application (IDPAmd) of the RUMD apparatus, the multiple RUDs including at least one of a watch associated with the user, a laptop associated with the user, or an additional RUMD associated with the user.

* * * * *